United States Patent
Kim et al.

(10) Patent No.: US 12,505,837 B2
(45) Date of Patent: Dec. 23, 2025

(54) ELECTRONIC DEVICE AND UTTERANCE PROCESSING METHOD OF THE ELECTRONIC DEVICE

(71) Applicant: SAMSUNG ELECTRONICS CO., LTD., Suwon-si (KR)

(72) Inventors: Taegu Kim, Suwon-si (KR); Dale Noh, Suwon-si (KR); Jimin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 18/081,210

(22) Filed: Dec. 14, 2022

(65) Prior Publication Data
US 2023/0123060 A1    Apr. 20, 2023

Related U.S. Application Data

(63) Continuation of application No. PCT/KR2022/010882, filed on Jul. 25, 2022.

(30) Foreign Application Priority Data

Aug. 20, 2021    (KR) .................. 10-2021-0110139

(51) Int. Cl.
*G10L 15/22*    (2006.01)
*G06F 40/30*    (2020.01)
(Continued)

(52) U.S. Cl.
CPC .......... *G10L 15/22* (2013.01); *G10L 15/1815* (2013.01); *G10L 15/30* (2013.01); *G06F 40/30* (2020.01); *G10L 2015/223* (2013.01)

(58) Field of Classification Search
USPC .................. 704/231, 235, 1–504
See application file for complete search history.

(56) References Cited

U.S. PATENT DOCUMENTS

11,361,764 B1 *    6/2022    Zhao .................. G10L 15/1815
11,715,467 B2 *    8/2023    Lefkofsky .............. G16H 50/70
                                                                    705/3

(Continued)

FOREIGN PATENT DOCUMENTS

KR    10-2020-0013152    2/2020
KR    10-2021-0001082    1/2021
(Continued)

OTHER PUBLICATIONS

International Search Report for PCT/KR2022/010882 mailed Oct. 21, 2022, 3 pages.

(Continued)

*Primary Examiner* — Marcus T Riley
(74) *Attorney, Agent, or Firm* — Nixon & Vanderhye P.C.

(57) ABSTRACT

An electronic device includes: a microphone configured to receive an audio signal including an utterance, a processor, and a memory configured to store instructions to be executed by the processor, wherein the processor may be configured to: generate a result of recognizing the utterance, determine whether the utterance is supported by the electronic device based on the result of recognizing the utterance, determine whether the utterance is to be processed by the electronic device based on whether the utterance is supported by the electronic device, and process a command corresponding to the utterance based on whether the utterance is to be processed by the electronic device.

18 Claims, 16 Drawing Sheets

(51) Int. Cl.
*G10L 15/18* (2013.01)
*G10L 15/30* (2013.01)

(56) References Cited

U.S. PATENT DOCUMENTS

| | | | | |
|---|---|---|---|---|
| 2019/0251975 | A1* | 8/2019 | Choi | G10L 17/06 |
| 2021/0074285 | A1 | 3/2021 | Golikov et al. | |
| 2021/0151040 | A1 | 5/2021 | Bak et al. | |
| 2021/0249013 | A1 | 8/2021 | Choi et al. | |
| 2022/0351719 | A1* | 11/2022 | Cho | G06F 3/017 |
| 2023/0123060 | A1* | 4/2023 | Kim | G10L 15/1815 |
| | | | | 704/235 |

FOREIGN PATENT DOCUMENTS

| | | | | |
|---|---|---|---|---|
| KR | 10-2021-0019920 | | 2/2021 | |
| KR | 10-2021-0042640 | | 4/2021 | |
| KR | 10-2021-0045241 | | 4/2021 | |
| KR | 10-2021-0047173 | | 4/2021 | |
| KR | 10-2021-0061091 | | 5/2021 | |
| KR | 20240038532 A | * | 3/2024 | H04R 3/12 |
| WO | 2021/101276 | | 5/2021 | |
| WO | WO-2024262868 A1 | * | 12/2024 | G10L 15/22 |

OTHER PUBLICATIONS

Korean Office Action dated Sep. 30, 2025 for KR Application No. 10-2021-0110139.

* cited by examiner

ELECTRONIC DEVICE AND UTTERANCE PROCESSING METHOD OF THE ELECTRONIC DEVICE

CROSS-REFERENCE TO RELATED APPLICATIONS

This application is a continuation of International Application No. PCT/KR2022/010882 designating the United States, filed on Jul. 25, 2022, in the Korean Intellectual Property Receiving Office and claiming priority to Korean Patent Application No. 10-2021-0110139, filed on Aug. 20, 2021, in the Korean Intellectual Property Office, the disclosures of which are incorporated by reference herein in their entireties.

BACKGROUND

1. Field

The disclosure relates to an electronic device and an utterance processing method of the electronic device.

2. Description of Related Art

The conventional utterance processing method updates intent masking information according to whether a received utterance is successful in an on-device artificial intelligence (AI), identifies intent information if an utterance is input later, and processes the utterance on a device if the intent is designated to be processed by the device.

In the conventional utterance processing method, when an utterance requesting an additional parameter is received, on-device AI processing may produce failed processing results even if the additional parameter is information obtainable on a device, and thus, the additional parameter should be always processed by a server again from the beginning.

SUMMARY

Embodiments of the disclosure may process an utterance by determining whether the utterance is to be processed on a device or whether the utterance is to be processed by a server according to content of the utterance or a situation when an utterance of a user is input.

Embodiments of the disclosure may process, when an input utterance is processable on a device, the utterance on a device without utilizing a server.

According to various example embodiments, an electronic device includes: a microphone configured to receive an audio signal including an utterance, a processor, and a memory configured to store instructions to be executed by the processor, wherein the processor may be configured to: generate a result of recognizing the utterance, determine whether the utterance is supported by the electronic device based on the result of recognizing the utterance, determine whether the utterance is to be processed by the electronic device based on whether the utterance is supported by the electronic device, and process a command corresponding to the utterance based on whether the utterance is to be processed by the electronic device.

According to various example embodiments, an electronic device includes: a microphone configured to receive an audio signal including an utterance, a processor, and a memory configured to store instructions to be executed by the processor, wherein the processor may be configured to: generate a result of recognizing the utterance, determine whether the utterance is primarily supported by the electronic device by performing a first classification based on a rule based on the result of recognizing the utterance, determine whether the utterance is secondarily supported by the electronic device by performing a second classification based on whether the utterance is primarily supported by the electronic device, and process a command corresponding to the utterance based on whether the utterance is secondarily supported by the electronic device.

According to various example embodiments, an utterance processing method of an electronic device includes: receiving an audio signal including an utterance, generating a result of recognizing the utterance, determining whether the utterance is supported by the electronic device based on the result of recognizing the utterance, determining whether the utterance is to be processed by the electronic device based on whether the utterance is supported by the electronic device, and processing a command corresponding to the utterance based on whether the utterance is to be processed by the electronic device.

According to various example embodiments, it is possible to efficiently process an utterance by determining whether the utterance is to be processed on a device or whether the utterance is to be processed by a server according to content of the utterance or a situation when an utterance of a user is input.

According to various example embodiments, when an input utterance is processible on a device, it is possible to reduce leakage of personal information in a device by not linking with a server, reduce communication costs, and reduce the utilization of the server.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
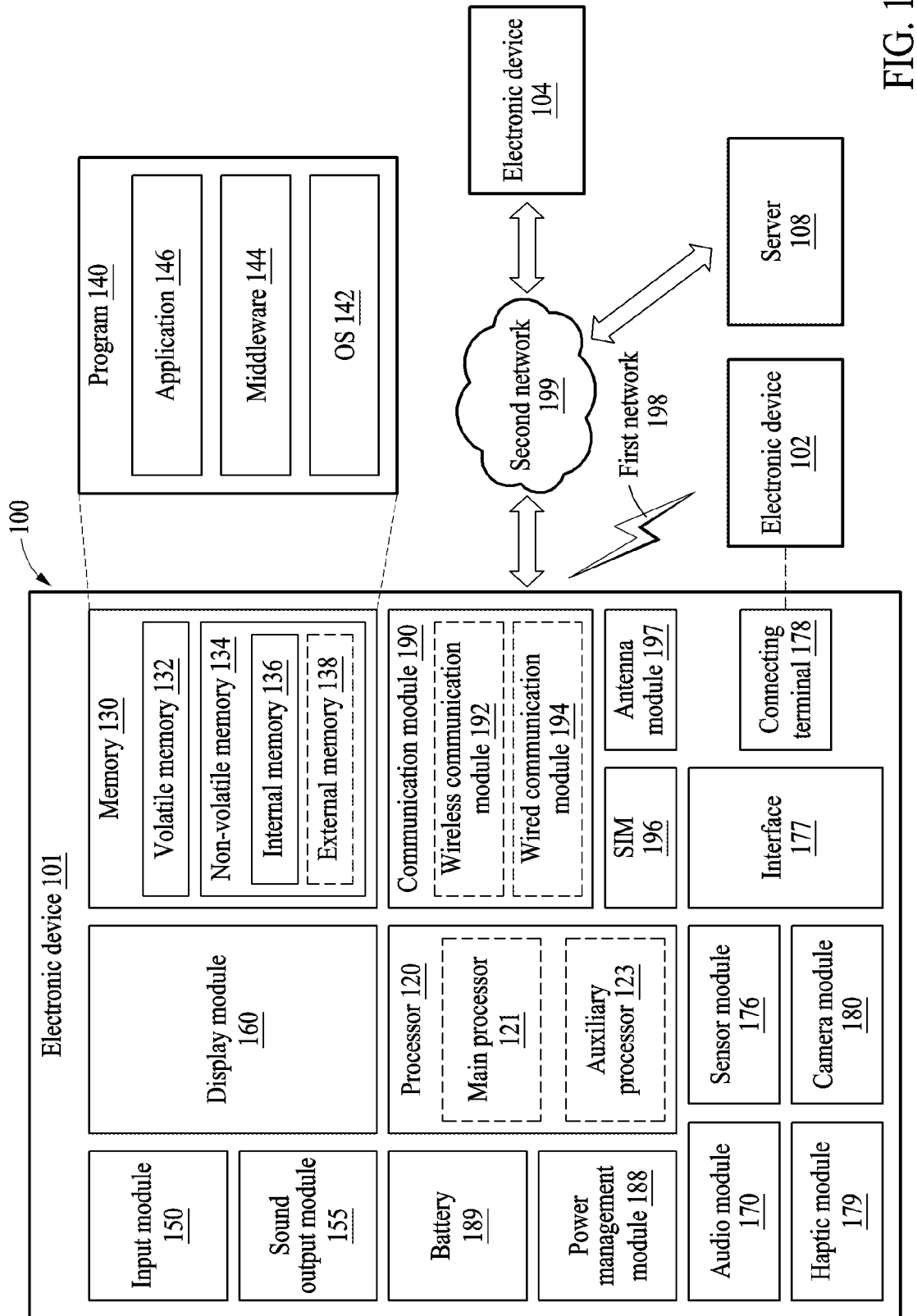
FIG. 1 is a block diagram illustrating an example electronic device in a network environment according to various example embodiments.

Hereinafter, example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one of the components (e.g., the connecting terminal 178) may be omitted from the electronic device 101, or one or more other components may be added in the electronic device 101. In various example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electrical signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
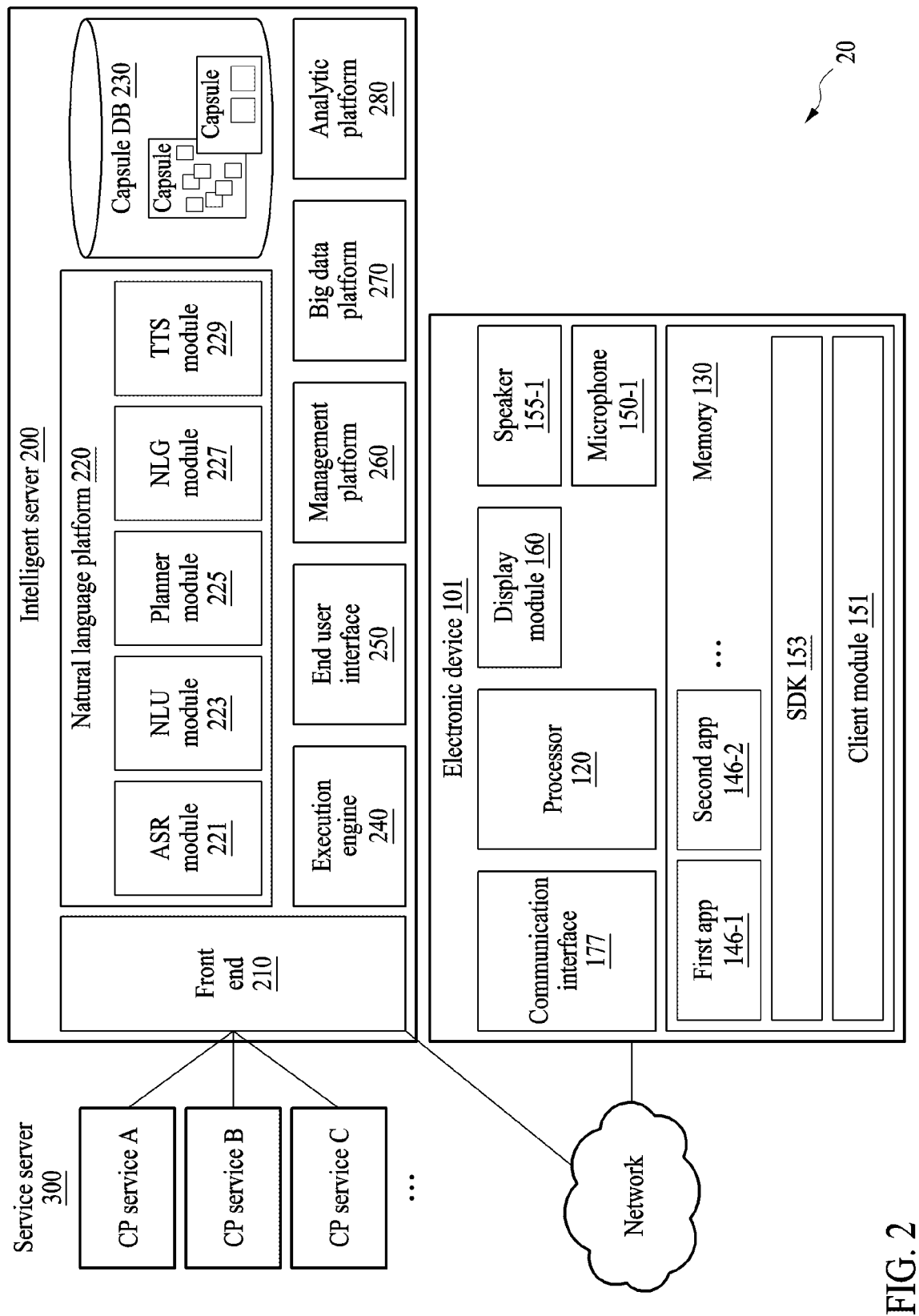
FIG. 2 is a block diagram illustrating an example configuration of an integrated intelligence system according to various embodiments.

FIG. 2 is a block diagram illustrating an example configuration of an integrated intelligence system according to various embodiments.

Referring to FIG. 2, an integrated intelligence system 20 according to an example embodiment may include an electronic device (e.g., the electronic device 101 of FIG. 1), an intelligent server 200 (e.g., the server 108 of FIG. 1), and a service server 300 (e.g., the server 108 of FIG. 1).

The electronic device 101 may be a terminal device (or an electronic device) connectable to the Internet, and may be, for example, a mobile phone, a smartphone, a personal digital assistant (PDA), a notebook computer, a TV, a white home appliance, a wearable device, a head-mounted display (HMD), or a smart speaker.

According to the shown example embodiment, the electronic device 101 may include a communication interface (e.g., including communication circuitry) 177 (e.g., the interface 177 of FIG. 1), a microphone 150-1 (e.g., the input module 150 of FIG. 1), a speaker 155-1 (e.g., the sound output module 155 of FIG. 1), a display module (e.g., including a display) 160 (e.g., the display module 160 of FIG. 1), a memory 130 (e.g., the memory 130 of FIG. 1), and/or a processor (e.g., including processing circuitry) 120 (e.g., the processor 120 of FIG. 1). The components listed above may be operationally or electrically connected to each other.

The communication interface 177 may include various communication circuitry and be connected to an external device and configured to transmit and receive data to and from the external device. The microphone 150-1 may receive a sound (e.g., a user utterance) and convert the sound into an electrical signal. The speaker 155-1 may output the electrical signal as a sound (e.g., a speech).

The display module 160 may include a display and be configured to display an image or video. The display module 160 may also display a graphical user interface (GUI) of an app (or an application program) being executed. The display module 160 may receive a touch input through a touch sensor. For example, the display module 160 may receive a text input through a touch sensor in an on-screen keyboard area displayed in the display module 160.

The memory 130 may store a client module 151, a software development kit (SDK) 153, and a plurality of apps 146-1, 146-2 . . . (e.g., the application 146 of FIG. 1). The client module 151 and the SDK 153 may configure a framework (or a solution program) for performing general-purpose functions. In addition, the client module 151 or the SDK 153 may configure a framework for processing a user input (e.g., a voice input, a text input, or a touch input).

The plurality of apps 146 stored in the memory 130 may be programs for performing designated functions. The plurality of apps 146 may include a first app 146-1, a second app 146-2, and the like. Each of the plurality of apps 146 may include a plurality of actions for performing a designated function. For example, the apps may include an alarm app, a messaging app, and/or a scheduling app. The plurality of apps 146 may be executed by the processor 120 to sequentially execute at least a portion of the plurality of actions.

The processor 120 may include various processing circuitry and control the overall operation of the electronic device 101. For example, the processor 120 may be electrically connected to the communication interface 177, the microphone 150-1, the speaker 155-1, and the display module 160 to perform a designated operation.

The processor 120 may also perform the designated function by executing the program stored in the memory 130. For example, the processor 120 may execute at least one of the client module 151 or the SDK 153 to perform the following operation for processing a user input. The processor 120 may control the operation of the plurality of apps 146 through, for example, the SDK 153. The following operation which is the operation of the client module 151 or the SDK 153 may be performed by the processor 120.

The client module 151 may receive a user input. For example, the client module 151 may receive a voice signal corresponding to a user utterance sensed through the microphone 150-1. As another example, the client module 151 may receive a touch input sensed through the display module 160. As still another example, the client module 151 may receive a text input sensed through a keyboard or an on-screen keyboard. In addition, the client module 151 may receive various types of user inputs sensed through an input module included in the electronic device 101 or an input module connected to the electronic device 101. The client module 151 may transmit the received user input to the intelligent server 200. The client module 151 may transmit state information of the electronic device 101 together with the received user input to the intelligent server 200. The state information may be, for example, execution state information of an app.

The client module 151 may receive a result corresponding to the received user input. For example, when the intelligent server 200 is capable of calculating a result corresponding to the received user input, the client module 151 may receive the result corresponding to the received user input. The client module 151 may display the received result on the display module 160. Further, the client module 151 may output the received result in an audio form through the speaker 155-1.

The client module 151 may receive a plan corresponding to the received user input. The client module 151 may display results of executing a plurality of actions of an app according to the plan on the display module 160. For example, the client module 151 may sequentially display the results of executing the plurality of actions on the display module 160 and output the results in an audio form through the speaker 155-1. As another example, the electronic device 101 may display only a portion of the results of executing the plurality of actions (e.g., a result of the last action) on the display module 160 and output the portion of the results in an audio form through the speaker 155-1.

According to an example embodiment, the client module 151 may receive a request for obtaining information necessary for calculating a result corresponding to the user input from the intelligent server 200. According to an example embodiment, the client module 151 may transmit the necessary information to the intelligent server 200 in response to the request.

The client module 151 may transmit information on the results of executing the plurality of actions according to the plan to the intelligent server 200. The intelligent server 200 may confirm that the received user input has been correctly processed using the information on the results.

The client module 151 may include a speech recognition module. According to an example embodiment, the client module 151 may recognize a voice input for performing a limited function through the speech recognition module. For example, the client module 151 may execute an intelligent app for processing a voice input to perform an organic operation through a designated input (e.g., Wake up!).

The intelligent server 200 may receive information related to a user voice input from the electronic device 101 through a communication network. According to an example embodiment, the intelligent server 200 may change data related to the received voice input into text data. According to an example embodiment, the intelligent server 200 may generate a plan for performing a task corresponding to the user voice input based on the text data.

According to an example embodiment, the plan may be generated by an artificial intelligence (AI) system. The artificial intelligence system may be a rule-based system or a neural network-based system (e.g., a feedforward neural network (FNN) or a recurrent neural network (RNN)). The artificial intelligence system may be a combination thereof or other artificial intelligence systems. According to an example embodiment, the plan may be selected from a set of predefined plans or may be generated in real time in response to a user request. For example, the artificial intelligence system may select at least one plan from among the predefined plans.

The intelligent server 200 may transmit a result according to the generated plan to the electronic device 101 or transmit the generated plan to the electronic device 101. According to an example embodiment, the electronic device 101 may display the result according to the plan on the display. According to an example embodiment, the electronic device 101 may display a result of executing an action according to the plan on the display.

The intelligent server 200 may include a front end 210, a natural language platform 220, a capsule database (DB) 230, an execution engine 240, an end user interface 250, a management platform 260, a big data platform 270, or an analytic platform 280.

The front end 210 may receive the received user input from the electronic device 101. The front end 210 may transmit a response corresponding to the user input.

According to an example embodiment, the natural language platform 220 may include various modules, each including various processing circuitry and/or executable program instructions, including, for example, an automatic speech recognition (ASR) module 221, a natural language understanding (NLU) module 223, a planner module 225, a natural language generator (NLG) module 227, or a text-to-speech (TTS) module 229.

The ASR module 221 may convert the voice input received from the electronic device 101 into text data. The NLU module 223 may discern an intent of a user using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase, and determine the intent of the user by matching the discerned meaning of the word to an intent.

The planner module 225 may generate a plan using a parameter and the intent determined by the NLU module 223. According to an example embodiment, the planner module 225 may determine a plurality of domains required to perform a task based on the determined intent. The planner module 225 may determine a plurality of actions included in each of the plurality of domains determined based on the intent. According to an example embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 which stores a set of relationships between concepts and actions.

The NLG module 227 may change designated information into a text form. The information changed to the text form may be in the form of a natural language utterance. The TTS module 229 may change information in a text form into information in a speech form.

According to an example embodiment, some or all of the functions of the natural language platform 220 may be implemented in the electronic device 101 as well.

The capsule DB 230 may store information on the relationship between the plurality of concepts and actions corresponding to the plurality of domains. A capsule according to an example embodiment may include a plurality of action objects (or action information) and concept objects (or concept information) included in the plan. According to an example embodiment, the capsule DB 230 may store a plurality of capsules in the form of a concept action network (CAN). According to an example embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there are a plurality of plans corresponding to the user input. According to an example embodiment, the capsule DB 230 may include a follow-up registry that stores information on follow-up actions for suggesting a follow-up action to the user in a designated situation. The follow-up action may include, for example, a follow-up utterance. According to an example embodiment, the capsule DB 230 may include a layout registry that stores layout information that is information output through the electronic device 101. According to an example embodiment, the capsule DB 230 may include a vocabulary registry that stores vocabulary information included in capsule information. According to an example embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In an example embodiment, the capsule DB 230 may be implemented in the electronic device 101 as well.

The execution engine 240 may calculate a result using the generated plan. The end user interface 250 may transmit the calculated result to the electronic device 101. Accordingly, the electronic device 101 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200.

The service server 300 may provide a designated service (e.g., food order or hotel reservation) to the electronic device 101. According to an example embodiment, the service server 300 may be a server operated by a third party. The service server 300 may provide information to be used for generating a plan corresponding to the received user input to the intelligent server 200. The provided information may be stored in the capsule DB 230. In addition, the service server 300 may provide result information according to the plan to the intelligent server 200.

In the integrated intelligence system 20 described above, the electronic device 101 may provide various intelligent services to the user in response to a user input. The user input may include, for example, an input through a physical button, a touch input, or a voice input.

In an example embodiment, the electronic device 101 may provide a speech recognition service through an intelligent app (or a speech recognition app) stored therein. In this case, for example, the electronic device 101 may recognize a user utterance or a voice input received through the microphone, and provide a service corresponding to the recognized voice input to the user.

In an example embodiment, the electronic device 101 may perform a designated action alone or together with the intelligent server and/or a service server, based on the received voice input. For example, the electronic device 101 may execute an app corresponding to the received voice input and perform a designated action through the executed app.

In an example embodiment, when the electronic device 101 provides a service together with the intelligent server 200 and/or the service server, the electronic device 101 may detect a user utterance using the microphone 150-1 and generate a signal (or voice data) corresponding to the detected user utterance. The electronic device 101 may transmit the speech data to the intelligent server 200 using the communication interface 177.

The intelligent server 200 may generate, as a response to the voice input received from the electronic device 101, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality of actions and the plurality of concepts.

The electronic device 101 may receive the response using the communication interface 177. The electronic device 101 may output a voice signal internally generated by the electronic device 101 to the outside using the speaker 155-1, or output an image internally generated by the electronic device 101 to the outside using the display module 160.

Figure 3:
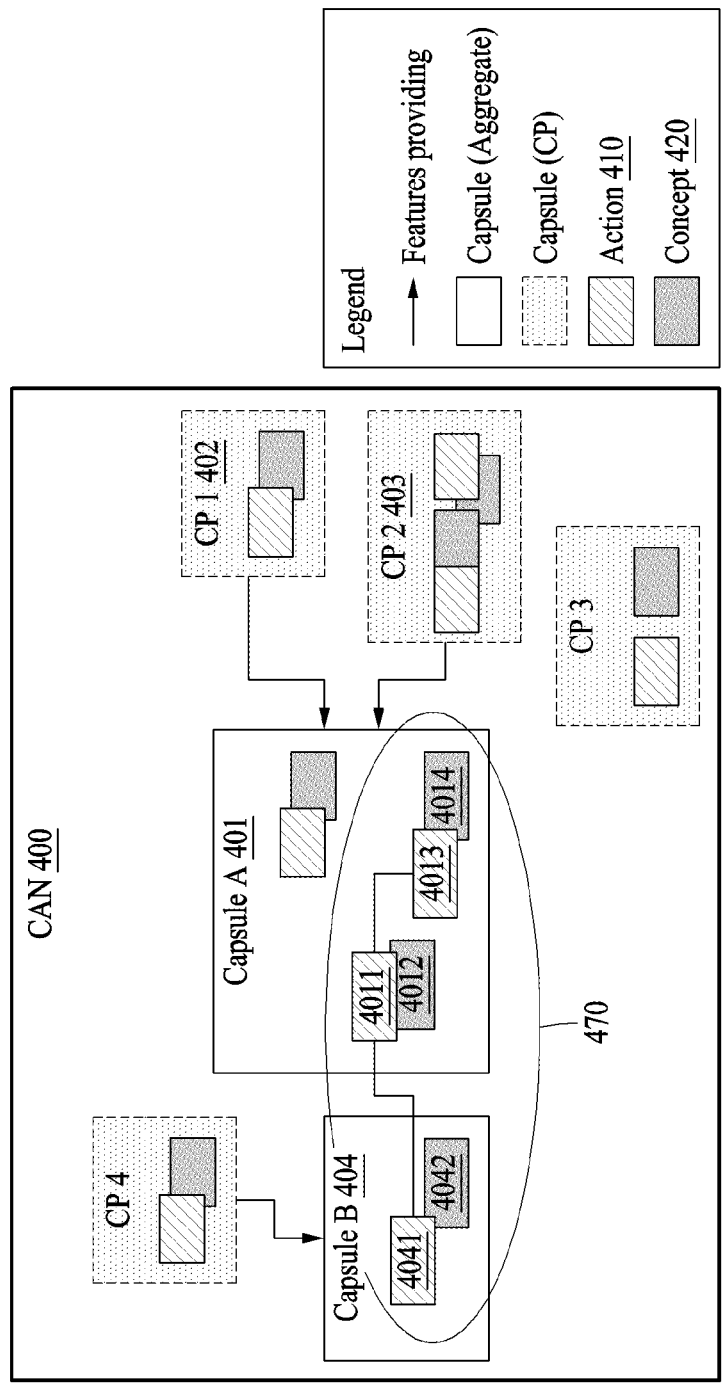
FIG. 3 is a diagram illustrating a form in which relationship information between concepts and actions is stored in a database according to various embodiments.

FIG. 3 is a diagram illustrating a form in which relationship information between concepts and actions is stored in a database according to various embodiments.

A capsule DB (e.g., the capsule DB 230) of the intelligent server 200 may store capsules in the form of a concept action network (CAN) 400. The capsule DB may store an action for processing a task corresponding to a voice input of a user and a parameter required for the action in the form of a CAN.

The capsule DB may store a plurality of capsules (a capsule A 401 and a capsule B 404) respectively corresponding to a plurality of domains (e.g., applications). According to an example embodiment, one capsule (e.g., the capsule A 401) may correspond to one domain (e.g., a location (geo) or an application). Further, the one capsule may correspond to at least one service provider (e.g., CP 1 402 or CP 2 403) for performing a function for a domain related to the capsule. According to an example embodiment, one capsule may include at least one action 410 for performing a designated function and at least one concept 420.

The natural language platform 220 may generate a plan for performing a task corresponding to the received voice input using the capsules stored in the capsule DB. For example, the planner module 225 of the natural language platform 220 may generate the plan using the capsules stored in the capsule DB. For example, a plan 407 may be generated using actions 4011 and 4013 and concepts 4012 and 4014 of the capsule A 401 and an action 4041 and a concept 4042 of the capsule B 404.

Figure 4:
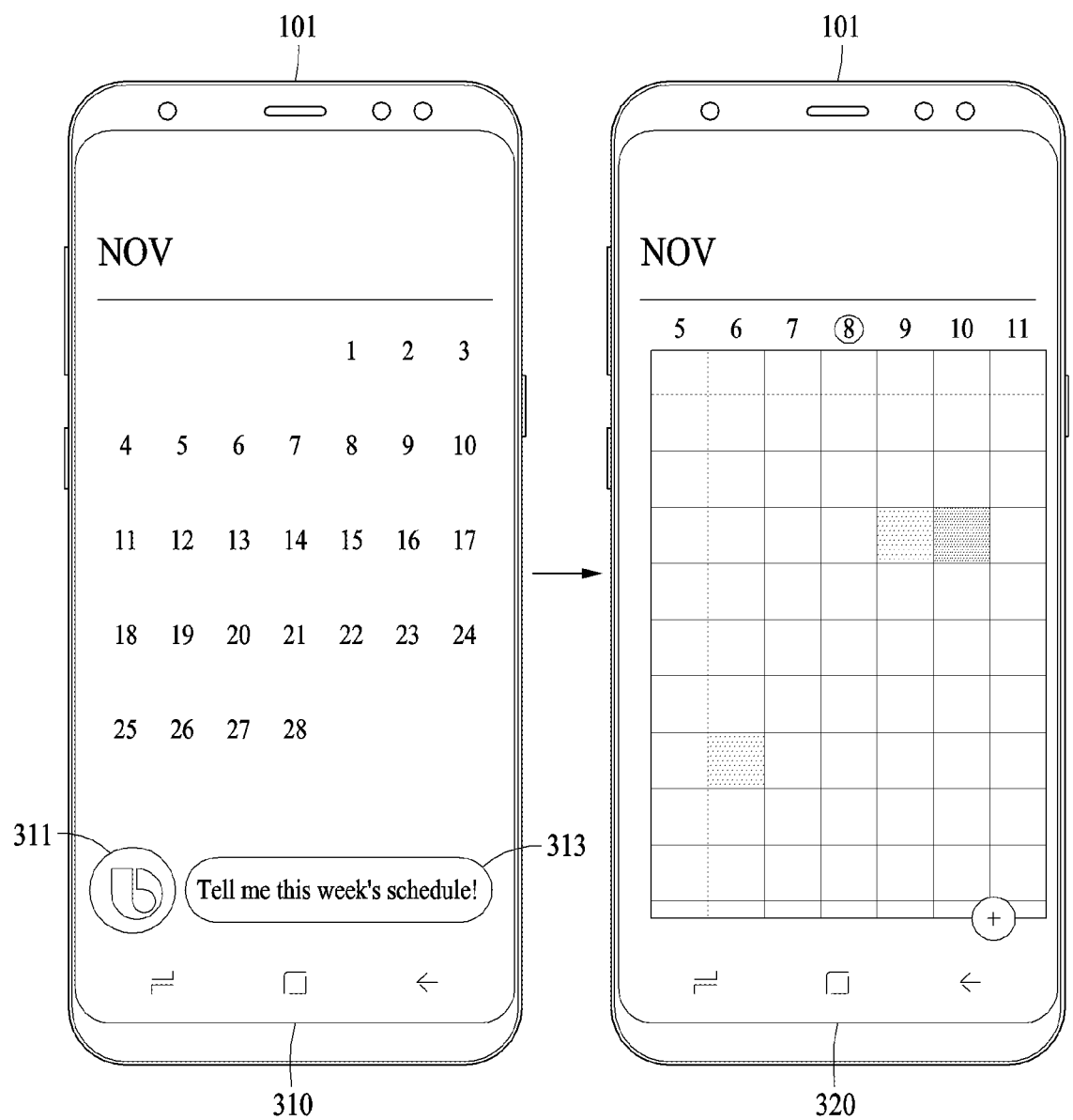
FIG. 4 is a diagram illustrating a screen of an electronic device processing a received voice input through an intelligent app according to various embodiments.

FIG. 4 is a diagram illustrating an example screen of an electronic device processing a received voice input through an intelligent app according to various embodiments.

An electronic device (e.g., the electronic device 101 of FIG. 1) may execute an intelligent app to process a user input through an intelligent server (e.g., the intelligent server 200 of FIG. 2).

According to an example embodiment, on a screen 310, when a designated voice input (e.g., Wake up!) is recognized or an input through a hardware key (e.g., a dedicated hardware key) is received, the electronic device 101 may execute an intelligent app for processing the voice input. The electronic device 101 may execute the intelligent app, for example, in a state in which a scheduling app is executed. According to an example embodiment, the electronic device 101 may display an object (e.g., an icon) 311 corresponding to the intelligent app on the display module 160. According to an example embodiment, the electronic device 101 may receive a voice input by a user utterance. For example, the electronic device 101 may receive a voice input of "Tell me this weeks schedule!". According to an example embodiment, the electronic device 101 may display a user interface (UI) 313 (e.g., an input window) of the intelligent app in which text data of the received voice input is displayed on the display.

According to an example embodiment, on a screen 320, the electronic device 101 may display a result corresponding to the received voice input on the display. For example, the electronic device 101 may receive a plan corresponding to the received user input, and display "the schedules this week" on the display according to the plan.

Figure 5:
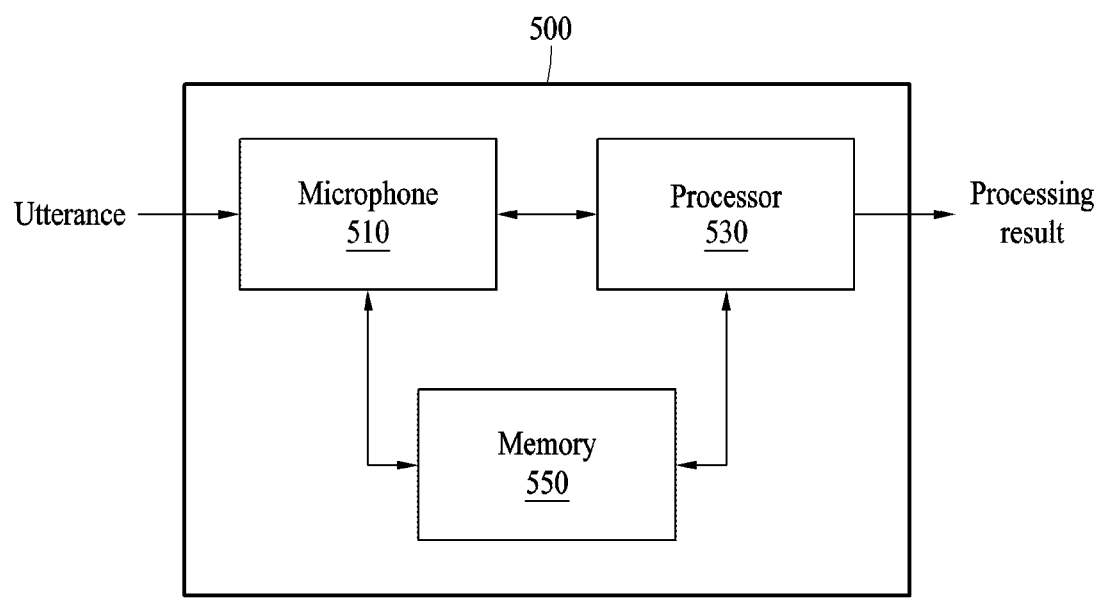
FIG. 5 is a block diagram illustrating an example configuration of an electronic device according to various embodiments.

FIG. 5 is a block diagram illustrating an example configuration of an electronic device according to various embodiments.

Referring to FIG. 5, according to various example embodiments, an electronic device 500 (e.g., the electronic device 101 of FIG. 1) may process an utterance of a user. The electronic device 500 may generate a processing result by processing the utterance of the user, and may provide the generated processing result to the user.

According to various example embodiments, the electronic device 500 may include a microphone 510 (e.g., the microphone 150-1 of FIG. 2), a processor (e.g., including processing circuitry) 530 (e.g., the processor 120 of FIG. 1), and a memory 550 (e.g., the memory 130 of FIG. 1). The microphone 510 may receive an audio signal including an utterance of a user. The microphone 510 may output the received audio signal to the processor 530.

According to various example embodiments, the processor 530 may include various processing circuitry and process data stored in the memory 550. The processor 530 may execute a computer-readable code (for example, software) stored in the memory 550 and instructions triggered by the processor 530. The processor 530 may be a hardware-implemented data processing device having a circuit that is physically structured to execute desired operations. For example, the desired operations may include code or instructions included in a program.

According to various example embodiments, the hardware-implemented data processing device may include a microprocessor, a central processing unit (CPU), a processor core, a multi-core processor, a multiprocessor, an application-specific integrated circuit (ASIC), and/or a field-programmable gate array (FPGA).

According to various example embodiments, the processor 530 may generate a result of recognizing an utterance. The processor 530 may generate the result of generating the utterance by generating a text corresponding to the utterance by performing automatic speech recognition (ASR) based on the utterance.

According to various example embodiments, the processor 530 may determine whether the utterance is supported by the electronic device 500 based on the result of recognizing the utterance. The processor 530 may determine whether the utterance is to be processed by the electronic device 500 based on whether the utterance is supported by the electronic device 500.

According to various example embodiments, the processor 530 may determine whether the utterance is processible by the electronic device 500 by inputting the result of recognizing the utterance into a rule-based natural language (NL) model. The processor 530 may determine whether an application (or an app) for processing the utterance is supported by the electronic device 500 based on the rule-based NL model.

According to various example embodiments, the processor 530 may process a command corresponding to the utterance using a linked application for processing the utterance when the result of recognizing the utterance includes a predetermined pattern.

According to various example embodiments, the processor 530 may search for an application to perform a command corresponding to the utterance based on the result of recognizing the utterance. The processor 530 may determine whether the application is executable by the electronic device. The processor 530 may transmit the result of recognizing the utterance to a server (e.g., the server 108 of FIG. 1 or the intelligent server 200 of FIG. 2) based on whether the application is executable by the electronic device. The processor 530 may transmit the result of recognizing the utterance or the audio signal to the server 108 when the application is not executable by the electronic device.

According to various example embodiments, the processor 530 may determine a need for an additional parameter for processing a command corresponding to the utterance. The processor 530 may search the memory 550 based on the need for the additional parameter.

According to various example embodiments, the type of the additional parameter may include a first type including numerical value information, a second type including information related to an operation for processing the utterance, and a third type including category information of information for processing the utterance. The type of the additional parameter will be described in greater detail below with reference to FIG. 9.

According to various example embodiments, the processor 530 may process a command corresponding to the utterance based on whether the utterance is to be processed by the electronic device.

According to various example embodiments, the processor 530 may determine whether the utterance is primarily supported by the electronic device 500 by performing a first classification based on a rule based on the result of recognizing the utterance. The processor 530 may determine whether the utterance is secondarily supported by the electronic device 500 by performing a second classification based on whether the utterance is primarily supported by the electronic device 500.

According to various example embodiments, the processor 530 may determine whether the utterance is processible by the electronic device 500 by inputting the result of recognizing the utterance into a rule-based NL model. The processor 530 may determine whether the utterance is primarily supported by the electronic device 500 by determining whether an application for processing the utterance is supported by the electronic device 500 based on the rule-based NL model.

According to various example embodiments, the processor 530 may determine whether the utterance is secondarily supported by the electronic device 500 by performing a classification of a target operation for processing the utterance. The processor 530 may search for an application to perform a command corresponding to the utterance based on the result of recognizing the utterance. The processor 530 may determine whether the utterance is secondarily supported by the electronic device 500 by determining whether the application is executable by the electronic device 500.

According to various example embodiments, the processor 530 may process a command corresponding to the utterance based on whether the utterance is secondarily supported by the electronic device 500. The processor 530 may transmit the result of recognizing the utterance to the server 108 based on whether the utterance is secondarily supported by the electronic device 500. The processor 530 may transmit the result of recognizing the utterance and/or the audio signal to the server 108 when the application is not executable by the electronic device 500.

According to various example embodiments, the memory 550 may store instructions (or programs) executable by the processor. For example, the instructions include instructions for performing an operation of the processor 530 and/or an operation of each component of the processor 530.

The memory 550 may be implemented as a volatile memory device (e.g., the volatile memory 132 of FIG. 1) or a non-volatile memory device (e.g., the non-volatile memory 134 of FIG. 1). The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device), or an insulator resistance change memory.

Figure 6:
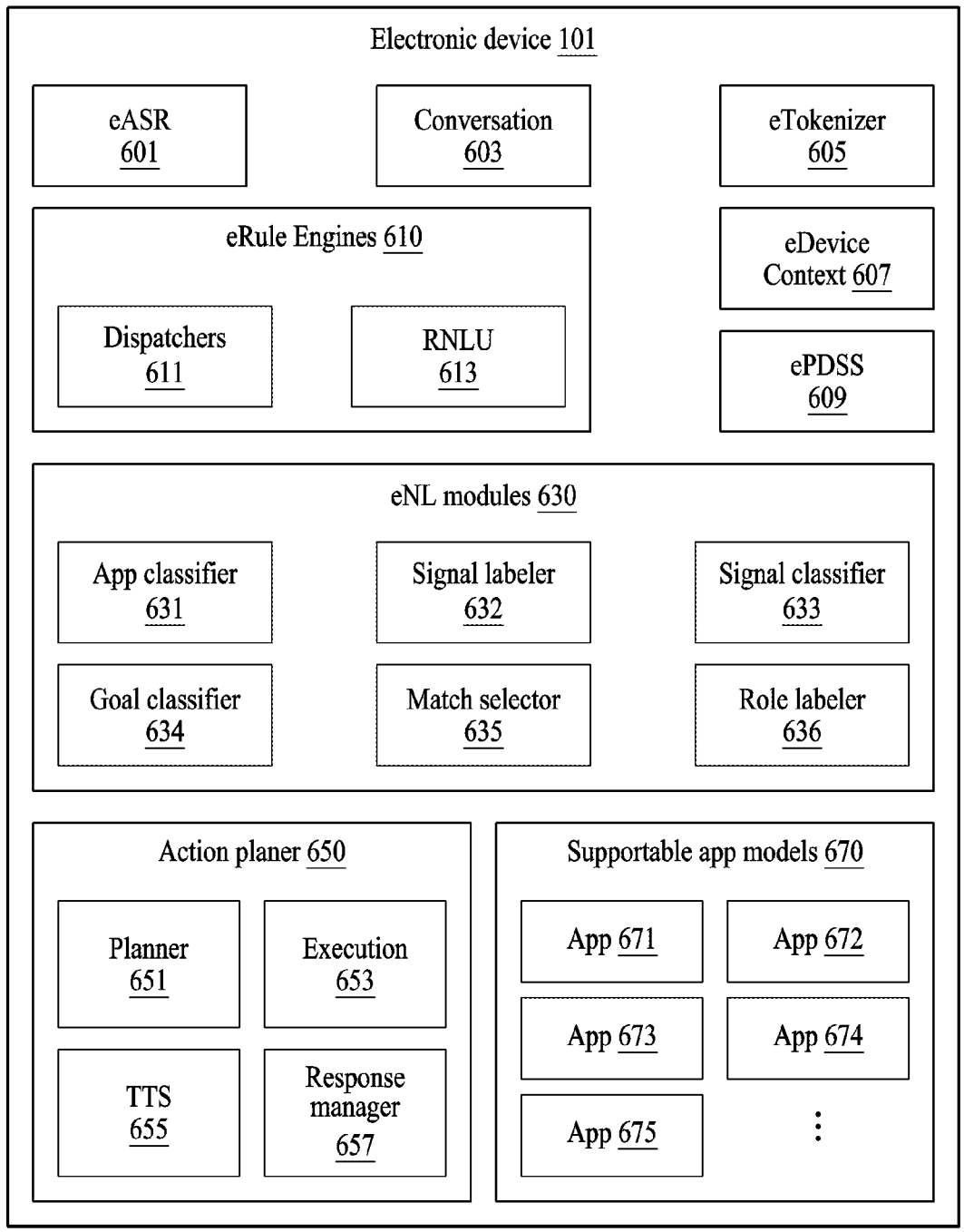
FIG. 6 is a block diagram illustrating an example system architecture of an electronic device according to various embodiments.

FIG. 6 is a block diagram illustrating an example system architecture of an electronic device according to various embodiments.

Referring to FIG. 6, according to various example embodiments, the electronic device 101 (e.g., the electronic device 500 of FIG. 5) may receive an utterance of a user, and determine whether to process the utterance on the electronic device 101 or transmit the utterance to a server (e.g., the server 108 of FIG. 1) to process the utterance according to content of the utterance or a situation. If the received utterance is processible internally by the electronic device 101, a processor (e.g., the processor 120 of FIG. 1) may process the utterance and provide a processing result to the user. When the electronic device 101 directly processes an utterance, the electronic device 101 may not be linked with the server 108, and thus, it is possible to prevent or reduce the transmission of personal information in the memory 130 and/or information such as device context and thereby reduce communication costs and the utilization of the server 108.

According to various example embodiments, the electronic device (e.g., the electronic device 101 of FIG. 1) may include various modules/engines, each including various processing circuitry and/or executable program instructions, including an embedded automatic speech recognition (eASR) 601, a conversation 603, an embedded tokenizer (eTokenizer) 605, an embedded device context (eDevice Context) 607, an embedded personal data sync service (ePDSS) 609, embedded rule engines (eRule Engines) 610, embedded natural language (eNL) modules 630, an action planner 650, and/or supportable app models 670. According to various example embodiments, the eRule Engines 610 may include dispatchers 611 and a rule natural language understanding (RNLU) 613. The eRule Engines 610 may determine a predetermined app or a predetermined device from an input utterance using various rule-based dispatchers and patterns with rules defined. The eRule Engines 610 may determine whether the utterance is processible by the electronic device 101 or is to be transmitted to the server 108 by comparing an action to be performed with enrolled patterns.

According to various example embodiments, the eNL modules 630 may include an app classifier 631, a signal labeler 632, a signal classifier 633, a goal classifier 634, a match selector 635, and/or a role labeler 636.

According to various example embodiments, the eNL modules 630 may perform utterance analysis on an utterance not determined by the eRule Engines 610 through classifiers using various NL modules. The eNL modules 630 may determine an app for processing the utterance through a capsule classifier. For example, when an utterance of "Play Through the Night by IU" is received and a music player application is determined to process the utterance, the eNL modules 630 may determine a goal (e.g., of playing a song) to be performed through the goal classifier 634.

According to various example embodiments, the signal labeler 632 may discriminate parameters included in the utterance (e.g., search keywords of "IU and "Through the Night" when an utterance of "Play Through the Night by IU" is received). Additional modules may be linked to predict the parameters and help with the determination. The match selector 635 may discriminate the parameters by determining a validity and a score between the obtained parameters and support the determination. The signal classifier 633 may determine whether there are meaningful information and parameters based on the entire utterance, rather than predetermined words in the utterance. The role labeler 636 may predict the meaning and concept of the parameters based on the obtained parameters. For example, when an utterance of "Play Through the Night by IU" is received, the role labeler 636 may predict that IU is an artist name and that Through the Night is a song title.

According to various example embodiments, the action planner 650 may include a planner 651, an execution 653, a text-to-speech (TTS) 655, and a response manager 657. The planner 651 may generate a plan graph using parameters and goals based on information obtained by the eNL modules 630. The planner 651 may determine an action to be performed and expected results based on the generated plan graph.

According to various example embodiments, the execution 653 may receive intent information containing the results obtained by the planner 651 and perform an operation in link with the supportable app models 670. The supportable app models 670 may include a plurality of apps 671, 672, 673, 674, and 675.

According to various example embodiments, the eASR 601 may convert a received audio signal or voice signal into processable text. The eTokenizer 605 may divide and discriminate the text into words for easy analysis of information of the converted text. The ePDSS 609 may manage personalized data for processing personalized information internally by the electronic device 101. The eDevice Context 607 may manage device information related to the electronic device 101.

According to various example embodiments, the eRule Engines 610 may determine a designated application for processing the utterance or determine a device for processing the utterance based on the utterance using patterns with a plurality of rules defined. The eRule Engines 610 may determine whether the utterance is processible by the electronic device 101 or is to be transmitted to the server 108 by comparing a pattern of the utterance with enrolled patterns.

A plurality of dispatchers 611 may be provided. The dispatchers 611 may recognize and classify the name of an application for processing the utterance. The dispatchers 611 may recognize and classify the name of a device for processing an utterance.

The eNL modules 630 may analyze an utterance not discriminated by the eRule Engines 610 using classifiers. When an application for processing the utterance is determined through the app classifier 631 (or the capsule classifier) (e.g., when a music player application is determined for an utterance of "Play music"), the goal classifier 634 may determine a goal (e.g., of playing a song). The signal labeler 632 may obtain the parameters included in the utterance. For example, the signal labeler 632 may determine "IU" and "Through the Night" in the utterance of "Play Through the Night by IU" to be search keywords. The match selector 635 may support the determination by discriminating the parameters by determining the validity between the obtained parameters and calculating a score. The signal classifier 633 may determine whether there are meaningful information or parameters based on the entire utterance, rather than designated words in the utterance. The role labeler 636 may predict the meaning or concept of the parameters based on the obtained parameters. For example, when an utterance of "Play Through the Night by IU" is received, the role labeler 636 may predict that IU is an artist name and that Through the Night is a song title.

According to various example embodiments, the planner 651 may generate a plan graph using parameters and goals. The planner 651 may determine an action to be performed and expected results in relation to the utterance based on the plan graph. The execution 653 may perform an operation in link with the plurality of apps 671, 672, 673, 674, and 675 of the supportable app models 670 based on intent information including the information provided by the planner 651.

Figure 7:
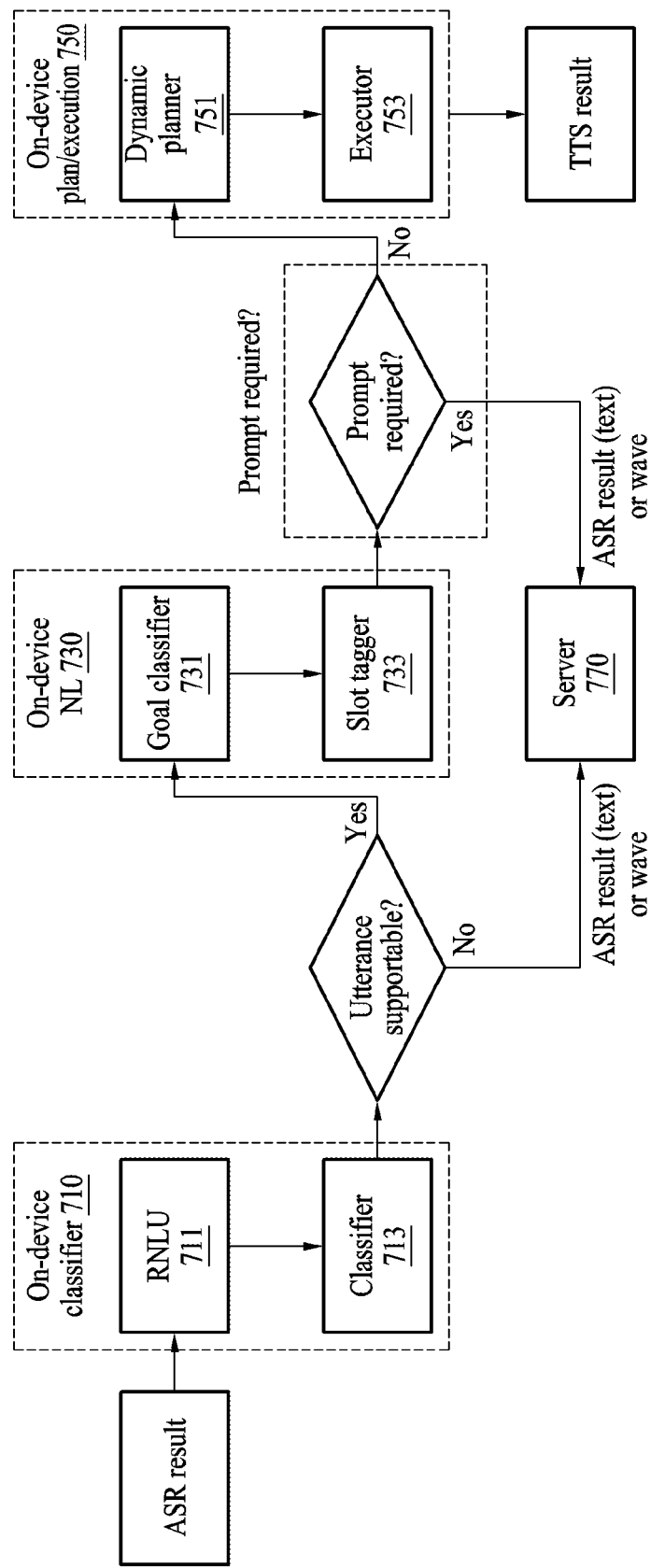
FIG. 7 is a diagram illustrating an example operation of an electronic device according to various embodiments.

FIG. 7 is a diagram illustrating an example operation of an electronic device according to various embodiments.

Referring to FIG. 7, according to various example embodiments, a processor (e.g., the processor 120 of FIG. 1 or the processor 530 of FIG. 5) may receive an utterance of a user and determine whether the received utterance states a designated domain. When the utterance states a designated domain, the processor 530 may process the utterance by an on-device NLU (e.g., the eNL modules 630 of FIG. 6) in an electronic device (e.g., the electronic device 500 of FIG. 5).

According to various example embodiments, when an additional parameter is required in the process of processing NLU, the processor 530 may determine whether the additional parameter is processible internally by the electronic device 500 or not. When the additional parameter is processible internally by the electronic device 500, the processor 530 may process the additional parameter using information stored in the electronic device 500. When the additional parameter is not processible internally by the electronic device 500, the processor 530 may operate to transmit utterance information to a server 770 (e.g., the server 108 of FIG. 1) such that the server 770 may process the utterance.

According to various example embodiments, the processor 530 may generate a result of recognizing the utterance of the user. The processor 530 may receive and analyze the utterance (or speech) of the user using ASR. The processor 530 may convert the utterance input to the electronic device (e.g., the electronic device 500 of FIG. 5) into an analyzable text using eASR (e.g., the eASR 601 of FIG. 6). The processor 530 may analyze the converted text and determine whether the utterance is processible.

According to various example embodiments, the processor 530 may analyze whether the utterance is supportable by the electronic device 500 through an on-device classifier 710 (e.g., the eRule Engines 610 of FIG. 6). The processor 530 may determine whether the utterance is supportable by the electronic device 500 based on a rule through the on-device classifier 710.

According to various example embodiments, the on-device classifier 710 may include a rule natural language understanding (RNLU) 711 and a classifier 713. The RNLU 711 may include dispatchers for recognizing and classifying device names and application names using one or more models that are configured based on a rule. For example, when an utterance of "Find Infinite Challenge on TV" is received, a dispatcher for recognizing device names may recognize "on TV" and transmit the utterance to the server 770 such that the server 770, rather than the electronic device 500, may process the utterance. When an utterance of "Find the photos that I took today from Gallery" is received, a dispatcher for recognizing application names may determine whether the utterance is to be processed by the electronic device 500 or by the server 770 by determining whether an application "Gallery" is supported by the electronic device 500. The classifier 713 may classify a device for processing the utterance or an application for processing the utterance.

According to various example embodiments, the processor 530 may process a command corresponding to the utterance using a linked application for processing the utterance when a result of recognizing the utterance, generated from the utterance, includes a predetermined pattern. When a designated utterance or a designated pattern is enrolled, the processor 530 may determine whether the utterance is supportable by the electronic device 500 based on a rule, using the on-device classifier 710 rather than using the dispatchers. For example, when an utterance of "Turn off the TV" is received, the processor 530 may process the utterance immediately using a linked application for controlling a device (e.g., TV), such that the utterance may be immediately processed by the electronic device 500, without being separately transmitted to the server 770. In addition, when a short utterance of "Back" or "Cancel" is received, the processor 530 may recognize that the utterance is processible through the electronic device 500 using the on-device classifier 710, without transmitting the utterance to the server 770 based on a rule.

According to various example embodiments, when the processor 530 fails to determine whether the utterance is supportable by the electronic device 500 using the RNLU model of the on-device classifier 710, the processor 530 may search for an application to execute a command corresponding to the received utterance using an on-device NL 730 (e.g., the eNL modules 630 of FIG. 6). The processor 530 may search for an application to perform the received utterance using a goal classifier 731 and a slot tagger 733 of the on-device NL 730. For example, when an utterance of "Turn on Bluetooth" is received, the on-device NL 730 may classify the utterance as a system/setting application, and if the system/setting application is supported by the electronic device 500, the electronic device 500 may internally process the utterance.

According to various example embodiments, the slot tagger 733 may extract a parameter from the utterance. The slot tagger 733 may include a signal labeler (e.g., the signal labeler 632 of FIG. 6), a signal classifier (e.g., the signal classifier 633 of FIG. 6), a match selector (e.g., the match selector 635 of FIG. 6), and a role labeler (e.g., the role labeler 636 of FIG. 6).

According to various example embodiments, when the on-device NL 730 determines that the received utterance is not supportable by the electronic device 500, the processor 530 may transmit the received utterance to the server 770.

According to various example embodiments, the processor 530 may transmit a result of recognizing the utterance and/or an audio signal to the server 770 when an application is not executable by the electronic device 500. For example, the processor 530 may transmit a text obtained through ASR to the server 770, or transmit a wave of the original sound of the audio signal including the received utterance to the server 770. The processor 530 may transmit both to the server 770. When the on-device NL 730 determines that the utterance is supportable by the electronic device 500, the processor 530 may process the utterance through the NL module (e.g., the eNL modules 630 of FIG. 6) in the electronic device 500.

According to various example embodiments, the processor 530 may determine a need for an additional parameter for processing a command corresponding to the utterance. The processor 530 may search a memory (e.g., the memory 550 of FIG. 5) based on a need for an additional parameter. The processor 530 may determine whether a prompt is required. According to an example embodiment, the processor 530 may determine whether a prompt is required based on whether the additional parameter is present in the memory. For example, when the additional parameter is absent from the memory, the processor 530 may determine that a prompt is required. When a prompt is required, the processor 530 may transmit the ASR result or the wave to the server 770.

According to various example embodiments, when a prompt is not required (e.g., when the additional parameter is present in the memory), the processor 530 may determine an action to be performed to process the command corresponding to the utterance using an on-device plan/execution module 750. The processor 530 may generate a plan graph using parameters and goals using a dynamic planner 751 (e.g., the planner 651 of FIG. 6), determine an action, and perform an operation for processing the command in link with an application based on intent information including the action and the plan graph using an executor 753 (e.g., the execution 653 of FIG. 6). The processor 530 may generate a result of performing the operation and/or a TTS result using a TTS (e.g., the TTS 655 of FIG. 6) and/or a response manager (e.g., the response manager 657 of FIG. 6) and provide the result of performing the operation and/or the TTS result to the user.

Figure 8:
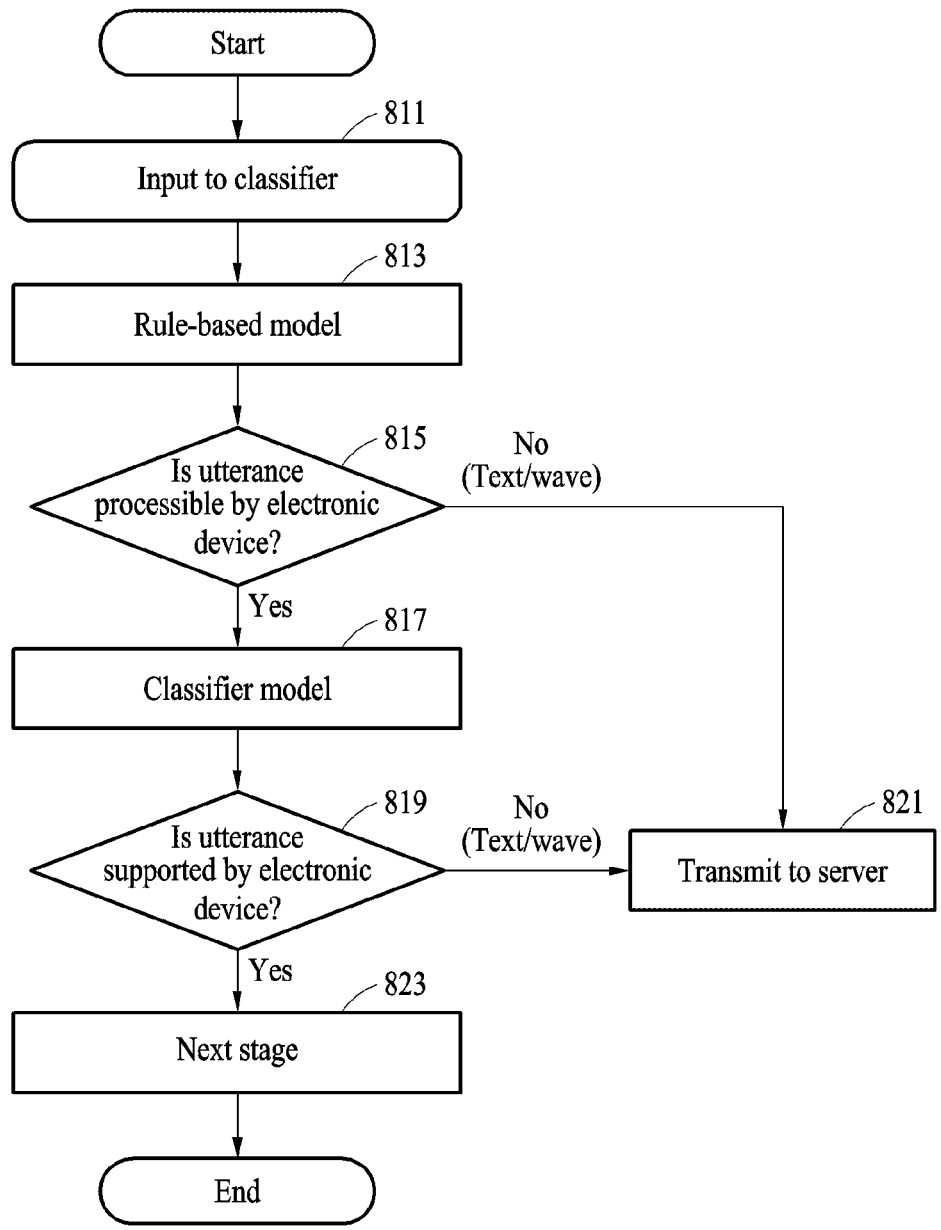
FIG. 8 is a flowchart illustrating an example classification operation of an electronic device according to various embodiments.

FIG. 8 is a flowchart illustrating an example operation of an electronic device according to various embodiments.

Referring to FIG. 8, according to various example embodiments, a processor (e.g., the processor 530 of FIG. 5) may generate a result of recognizing an utterance included in a speech of a user, and determine whether the utterance is primarily supported by an electronic device (e.g., the electronic device 500 of FIG. 5) by performing a first classification based on a rule based on the generated result of recognizing the utterance. The processor 530 may determine whether the utterance is secondarily supported by the electronic device 500 by performing a second classification based on whether the utterance is primarily supported by the electronic device 500.

According to various example embodiments, in operation 811, the processor 530 may input a received utterance to a classifier (e.g., the on-device classifier 710 of FIG. 7). In operation 813, the processor 530 may input the utterance to a rule-based model. In operation 815, the processor 530 may determine whether it is possible for the rule-based model to determine whether the utterance is processible by the electronic device 500. According to various example embodiments, when the utterance is not supportable/processible by the electronic device 500, the processor 530 may transmit a text and/or a wave to a server (e.g., the server 108 of FIG. 1), in operation 821.

According to various example embodiments, when the rule-based model (e.g., the eRule Engines 610 of FIG. 6) determines that the utterance is supported by the electronic device 500, the processor 530 may input the utterance to a classifier model (e.g., the eNL modules 630 of FIG. 6), in operation 817. In operation 819, the processor 530 may determine whether it is possible for the classifier model to determine whether the utterance is supported by the electronic device 500. When the utterance is not supportable by the electronic device 500, the processor 530 may transmit the text and/or the wave to the server (e.g., the server 108 of FIG. 1), in operation 821. When the utterance is determinable by the electronic device, the processor 530 may enter a next stage, in operation 823.

Figure 9A:
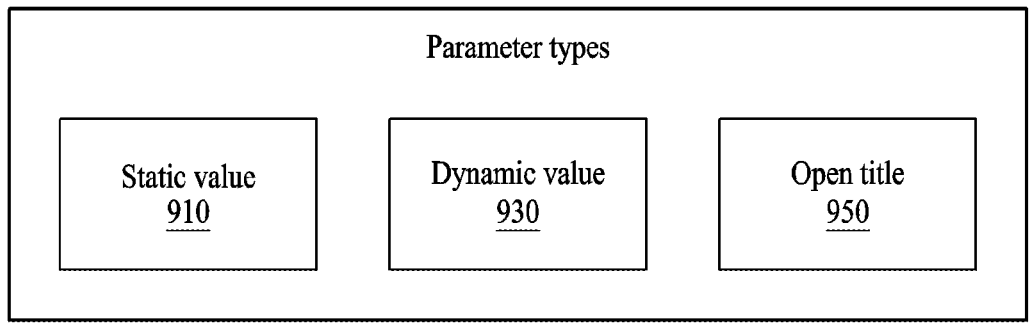
FIGS. 9A and 9B are diagrams illustrating additional parameters according to various embodiments.
Figure 9B:
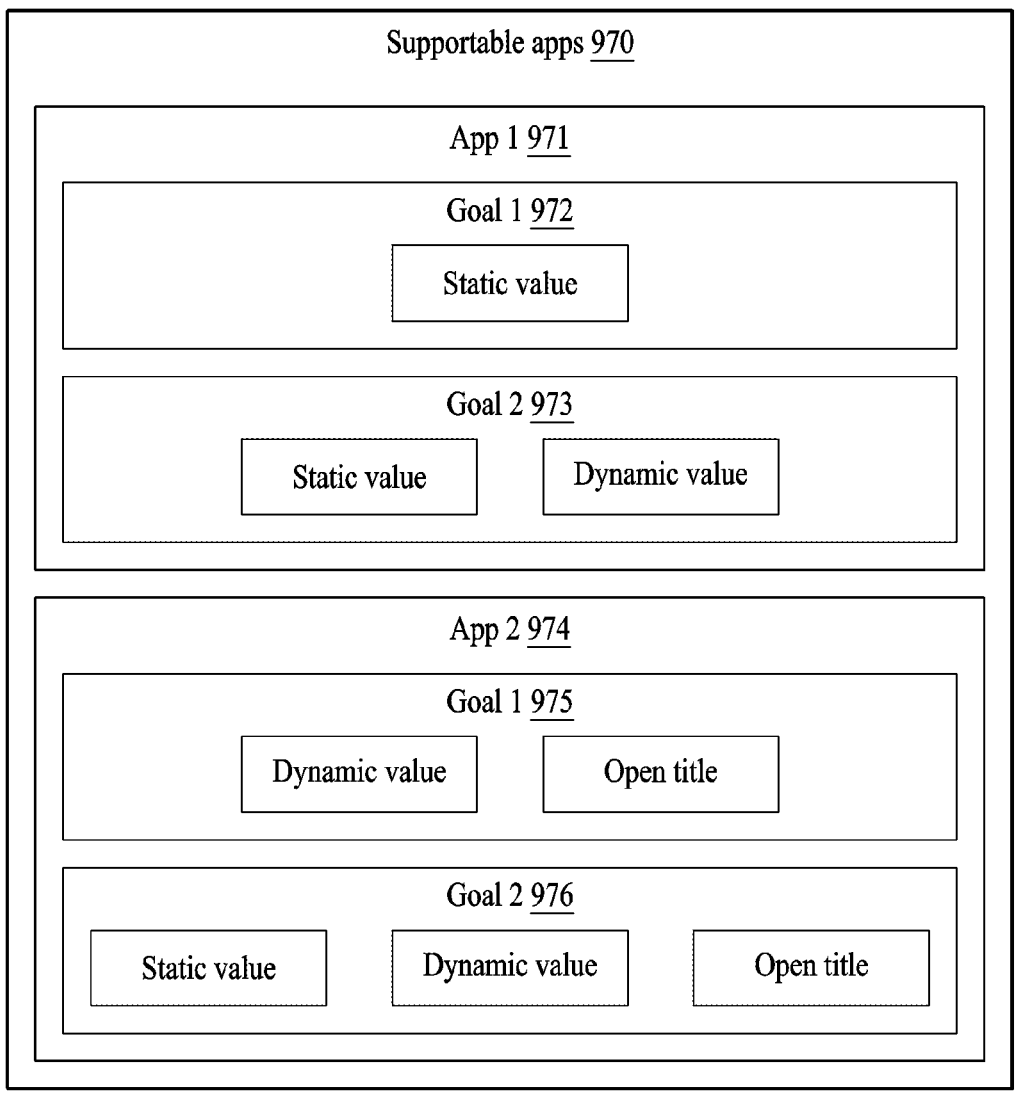

FIGS. 9A and 9B are diagrams illustrating additional parameters according to various embodiments.

Referring to FIGS. 9A and 9B, according to various example embodiments, a processor (e.g., the processor 530 of FIG. 5) may obtain a type of an additional parameter for processing a command corresponding to an utterance, and determine whether the utterance is to be processed by an electronic device (e.g., the electronic device 500 of FIG. 5) based on the type of the additional parameter.

According to various example embodiments, the type of the additional parameter may include a first type including numerical value information, a second type including information related to an operation for processing the utterance, and a third type including category information of information for processing the utterance.

According to various example embodiments, after an application to perform the utterance is determined through an NL classifier (e.g., the on-device classifier 710 of FIG. 7), the processor 530 may input the utterance to an on-device NL module (e.g., the on-device NL module 730) to define an operation to be performed through models of the NL and extract parameters in the utterance. The processor 530 may determine an operation to be performed to process a command corresponding to the utterance through a goal classifier (e.g., the goal classifier 731 of FIG. 7). The processor 530 may classify parameters in the utterance and perform prediction using modules such as a signal labeler (e.g., the signal labeler 632 of FIG. 6), a match selector (e.g., the match selector 635 of FIG. 6), and a signal classifier (e.g., the signal classifier 633 of FIG. 6).

According to various example embodiments, the processor 530 may request additional information from a user in addition to the data received in the process of analyzing and processing the received utterance. For example, when an utterance of "Add a dinner meeting at 8 to my calendar" is received, a device for processing the utterance may request the user to provide additional information for accurate enrollment, asking "What's the location?" or "What date is it?". In this case, in the process of receiving and analyzing the additional information, support from a server (e.g., the server 108 of FIG. 1) other than the electronic device 500 may be required.

According to various example embodiments, a memory (e.g., the memory 550 of FIG. 5) may store information about supportable applications and goals according to types of parameters. The processor 530 may determine whether the utterance is to be processed by the electronic device 500 or transmitted to the server 108 based on the information about the goals supported for the respective applications and information about the sorts (or types) of parameters used for the goals.

According to various example embodiments, the processor 530 may perform a determination on applications (apps) and goals supportable by the electronic device 500 based on parameter information. The types of parameters may include a first type, a second type, and a third type.

According to various example embodiments, the parameter of the first type may include a static value 910. The static value 910 may refer to a form such as a value that is promptly obtainable from a determined goal, such as "1", "2", "20%", "80%", "Turn on", or "Turn off", without additionally searching the inside or outside of the electronic device 500. For example, when the processor 530 determines a goal of controlling the volume (volume_control) is requested in receiving and processing an utterance of "Control the volume", a parameter of the goal may be the static value 910. At this time, the processor 530 may provide a user with a prompt of "What's the volume level you want?", and when an utterance including additional parameter information regarding the volume level matches the static value 910 related to an actual value, the utterance may be processed by the electronic device 500. If an additional information utterance that does not match the static value 910 is received from the user, the processor 530 may process the received utterance as a failed operation in the electronic device 500 or perform an additional operation of transmitting the utterance to the server 108.

According to various example embodiments, the parameter of the second type may include a dynamic value 930. The dynamic value 930 may refer to additional information values, other than the static value 910, required to perform a goal. The dynamic value 930 may be information stored in the memory 550 or information stored in the server 108. For example, when a user utterance of "Show me the photos in Gallery" is received and a goal of showing the gallery (gallery_show) is determined, the processor 530 may recognize that a parameter of the goal of showing the gallery is the dynamic value 930. The processor 530 may request additional information from the user through a prompt of "What kind of photos do you want?" and, when additional information such as "Family album" is received, may search for matching information in the electronic device 500. When matching information exists, the processor 530 may process the utterance internally by the electronic device 500, and when the information does not exist, the processor 530 may transmit the utterance to the server 108 for processing.

According to various example embodiments, the processor 530 may transmit the obtained goal and the dynamic value 930 to an application, and if the result of processing by the application is a failure, may transmit the utterance to the server 108 for processing. When additional information is received as the dynamic value 930, the processor 530 may determine whether the additional information is present in the electronic device 500, and determine whether to transmit the additional information to the server 108.

According to various example embodiments, the parameter of the third type may include an open title 950. The open title 950 may refer to a parameter that may have basically any value. The open title 950 may have a category value indicating the type of information. For example, the category may include information such as a "song title", an "actor", and/or a "location". The operation of the processor 530 may vary according to whether the category included in the open title 950 is processible by the electronic device 500. The processor 530 may allow the electronic device 500 to directly process an operation such as a memo or dictation that copies the utterance as it is. In the case of a category of information that is not processible, the processor 530 may transmit the utterance to the server 108 for processing.

According to various example embodiments, the processor 530 may recognize supportable apps 970 and information about a type of parameter needed to process the utterance, as in the example of FIG. 9B. An app 1 971 may perform a goal 1 972 and a goal 2 973 to process the utterance, wherein the goal 1 972 may use a parameter of a static value type, and the goal 2 973 may use parameters of static value and dynamic value types. An app 2 974 may perform a goal 1 975 and a goal 2 976 to process the utterance, wherein the goal 1 975 may use parameters of dynamic value and open title types, and the goal 2 976 may use parameters of static value, dynamic value, and open title types.

Figure 10:
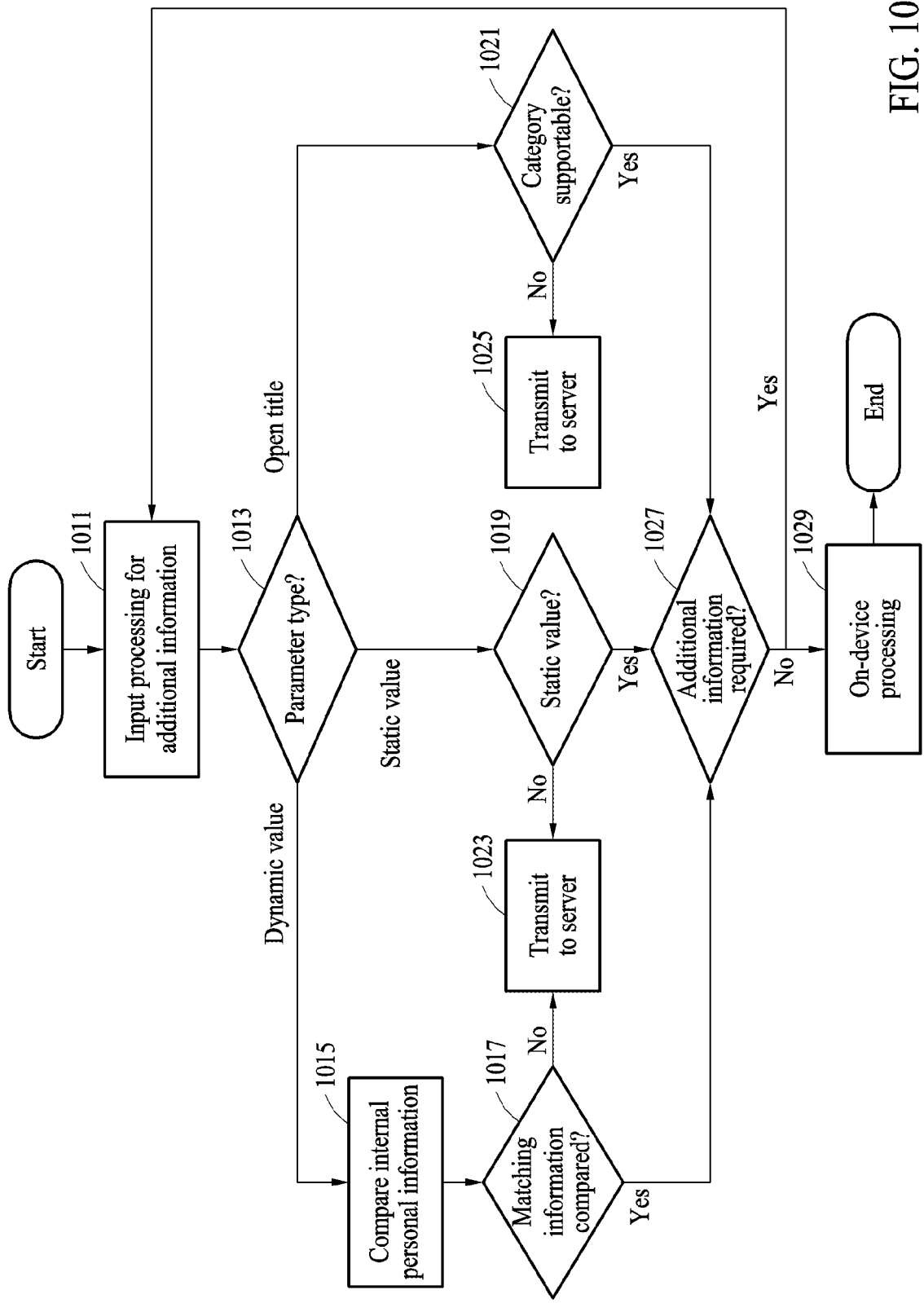
FIG. 10 is a flowchart illustrating an example operation of determining a need for an additional parameter according to various embodiments.

FIG. 10 is a flowchart illustrating an example operation of determining a need for an additional parameter according to various embodiments.

Referring to FIG. 10, according to various example embodiments, a processor (e.g., the processor 530 of FIG. 5) may determine whether an utterance is to be processed on a device (e.g., the electronic device 500 of FIG. 5) based on additional information (e.g., an additional parameter). In operation 1011, the processor 530 may perform input processing for the additional information. In operation 1013, the processor 530 may determine a parameter type of the additional information. When the additional information is a dynamic value (e.g., the dynamic value 930 of FIG. 9A), the processor 530 may compare internal personal information, in operation 1015. In operation 1017, the processor 530 may determine whether matching information is compared. When there is no matching information, the processor 530 may transmit the utterance to a server (e.g., the server 108 of FIG. 1), in operation 1023. When there is matching information, the processor 530 may determine whether additional information is required, in operation 1027.

According to various example embodiments, in operation 1019, the processor 530 may determine whether the type of the parameter is a static value (e.g., the static value 910 of FIG. 9A). When the type of the parameter is not a static value, the processor 530 may transmit the utterance to the server 108. When the type of the parameter is a static value, the processor 530 may determine whether additional information is required, in operation 1027.

According to various example embodiments, when the type of the parameter is an open title (e.g., the open title 950 of FIG. 9A), the processor 530 may determine whether a category included in the open title is supportable, in operation 1021. When the category is not supportable, the processor 530 may transmit the utterance to the server 108, in operation 1025. When the category is supportable, the processor 530 may determine whether additional information is required, in operation 1027. When additional information is required, the processor 530 may perform operation 1011 again, and when additional information is not required, may perform on-device processing, in operation 1029.

According to various example embodiments, in the process of receiving additional information about supported applications and goals, when it is determined to transmit the utterance to the server 108 as the electronic device 500 is hard to support or needs support from the server 108, the processor 530 may transmit the utterance to the server 108 and hand over the processing even when operating with on-device support. When it is determined to transmit the utterance to the server 108, the processor 530 may transmit wave sound information of the received utterance as it is, and transmit the goal obtained while processing the utterance on the device and the additionally input parameter to the server 108.

Figure 11:
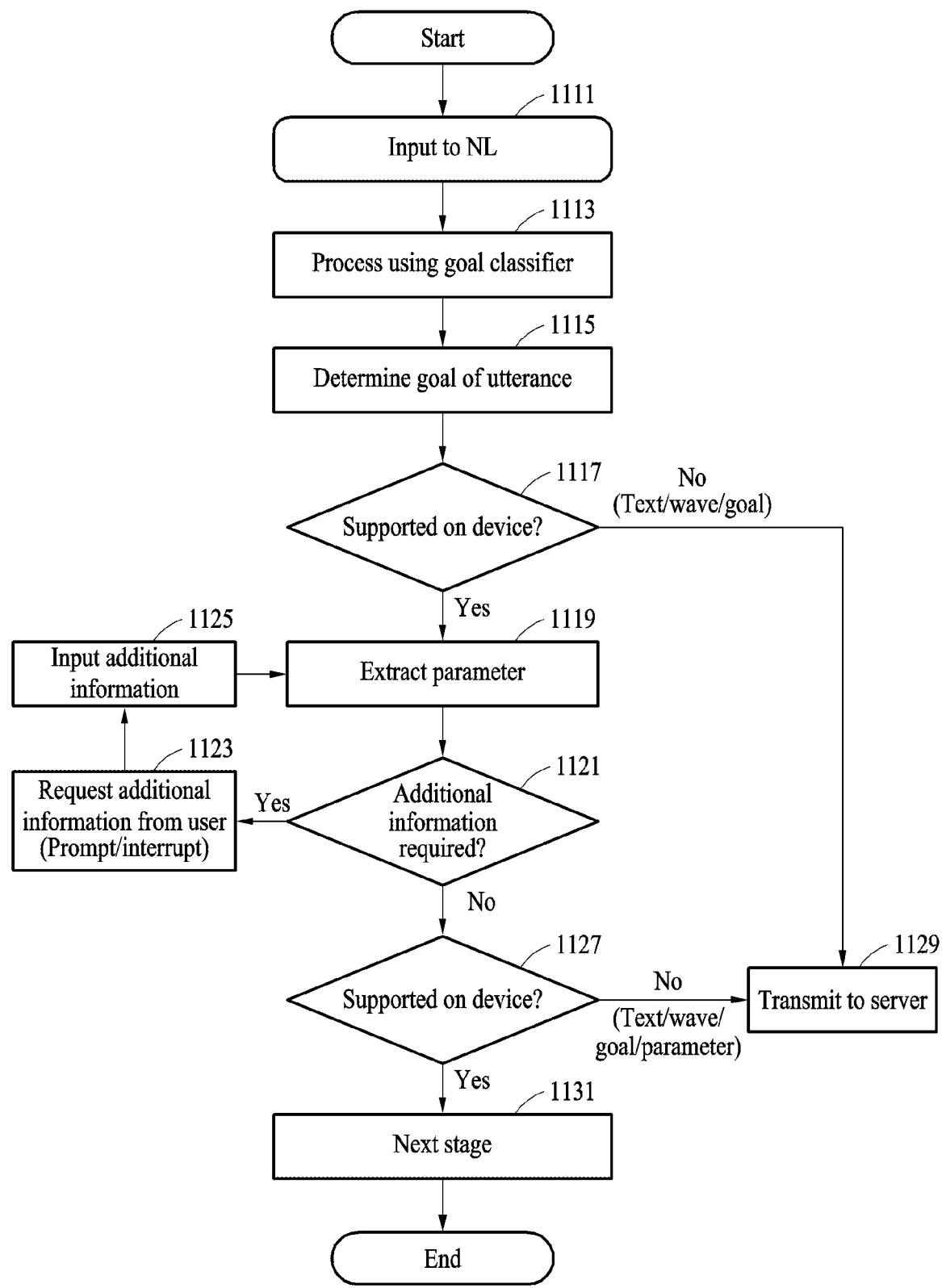
FIG. 11 is a flowchart illustrating an example operation in an on-device natural language (NL) section according to various embodiments.
Figure 12A:
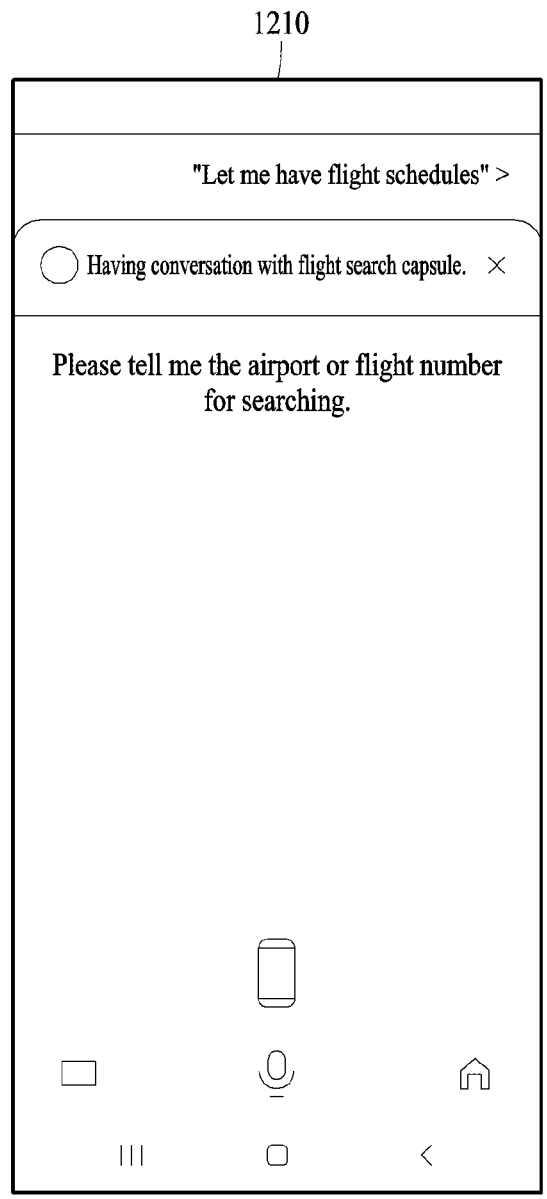
FIGS. 12A, 12B and 12C are diagrams illustrating examples of a user interface for utterance processing according to various embodiments.
Figure 12B:
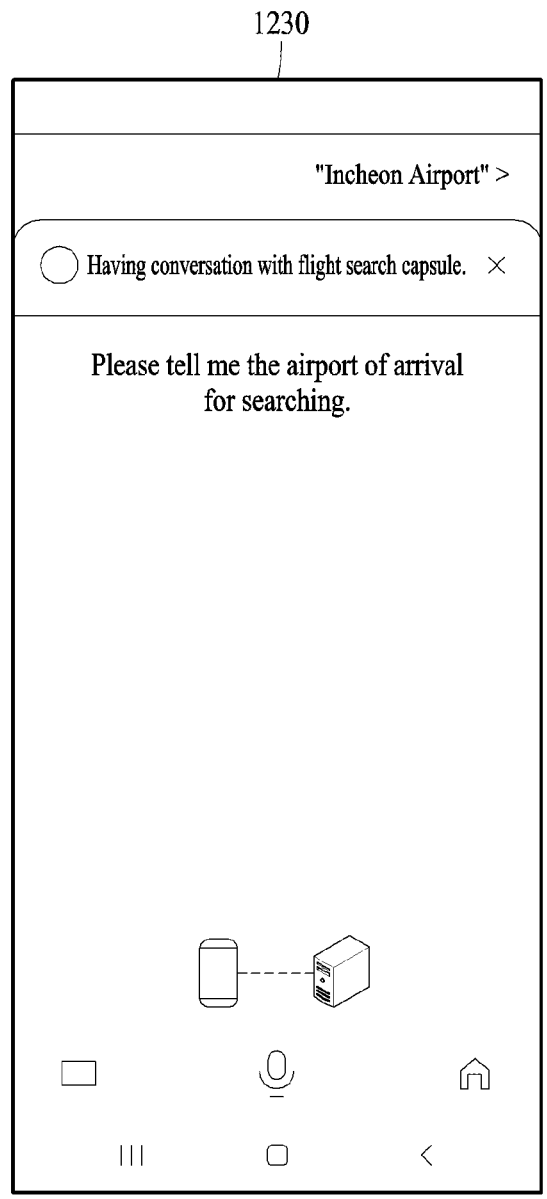
Figure 12C:
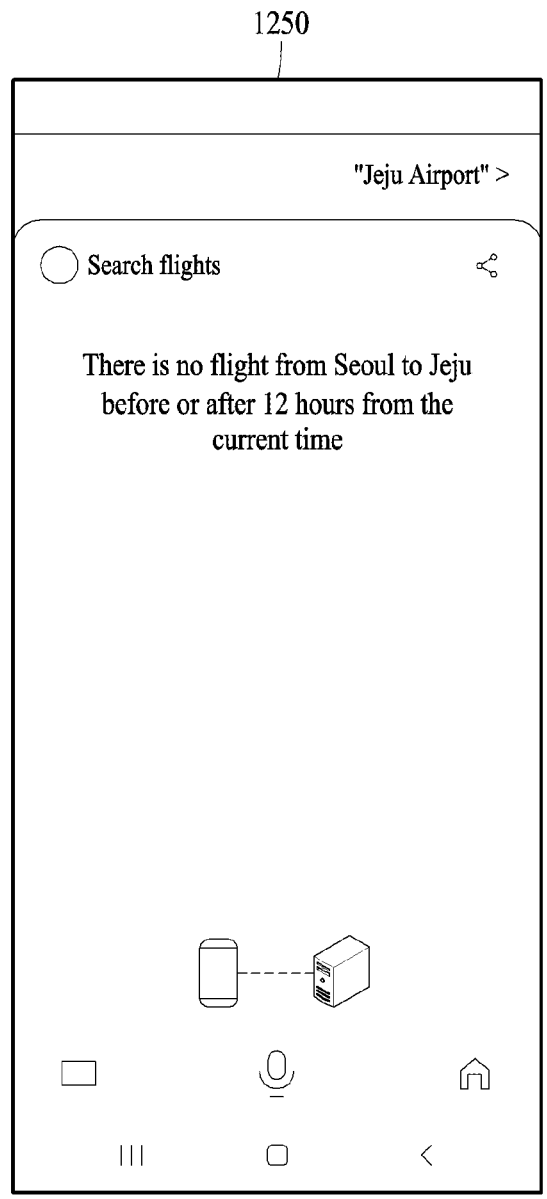

FIG. 11 is a flowchart illustrating an example operation in an on-device natural language (NL) section according to various embodiments.

Referring to FIG. 11, according to various example embodiments, in operation 1111, a processor (e.g., the processor 530 of FIG. 5) may input an utterance to an NL model (e.g., the on-device NL 730 of FIG. 7). In operation 1113, the processor 530 may process the utterance using a goal classifier (e.g., the goal classifier 731 of FIG. 7). In operation 1115, the processor 530 may determine a goal for processing the utterance based on a result of processing by the goal classifier.

According to various example embodiments, in operation 1117, the processor 530 may determine whether the utterance is supported on a device (e.g., the electronic device 500 of FIG. 5) based on the determined goal. When the utterance is supported on the device, the processor 530 may extract a parameter, in operation 1119. When the utterance is not supported on the device, the processor 530 may transmit the utterance to a server (e.g., the server 108 of FIG. 1), in operation 1129.

According to various example embodiments, in operation 1121, the processor 530 may determine whether additional information is required. When additional information is required, the processor 530 may request additional information from a user, in operation 1123. For example, the processor 530 may request the additional information in the form of a prompt or an interrupt. In operation 1125, the processor 530 may input the received additional information. The processor 530 may perform operation 1119 again based on the input additional information.

According to various example embodiments, when additional information is not required, the processor 530 may determine whether the utterance is supported on the device, in operation 1127. When the utterance is not supported on the device, the processor 530 may transmit the utterance to the server 108, in operation 1129. When the utterance is supported on the device, the processor 530 may proceed with a next stage, in operation 1131.

According to various example embodiments, a classifier and an NL module may determine whether the utterance is supportable on the device, and when it is determined that the utterance is not supportable on the device, the processor 530 may allow the server 108 to process the utterance, and receive a processing result from the server 108 and provide the processing result to the user. When the utterance is processible on the device, an action planner (e.g., the action planner 650 of FIG. 6) implemented internally on the device may perform an operation to be performed in link with an application, and visually and/or audibly provide the result to the user.

FIGS. 12A, 12B, 12C and 13 are diagrams illustrating examples of a user interface for utterance processing according to various embodiments.

Referring to FIGS. 12A, 12B, 12C and 13, according to various example embodiments, a processor (e.g., the processor 530 of FIG. 5) may receive an audio signal including an utterance from a user, and request additional information from the user through a prompt based on the received audio signal. For example, when an utterance of "Let me have flight schedules" is received, the processor 530 may provide a screen like a user interface 1210. In other words, the processor 530 may request additional information from the user through a prompt. For example, the processor 530 may provide a prompt of "Please tell me the airport or flight number for searching".

According to various example embodiments, in response to an answer to the request for the additional information, the processor 530 may provide a screen like a user interface 1230. For example, the processor 530 may request additional information through a prompt of "Please tell me the airport of arrival for searching" in response to an answer of the user, "Incheon Airport".

According to various example embodiments, in response to an answer to the request for the additional information, the processor 530 may provide a screen like a user interface 1250. For example, the processor 530 may provide the user with an answer saying "There is no flight from Seoul to Jeju before or after 12 hours from the current time" in response to an answer of the user saying "Jeju Airport".

Figure 13:
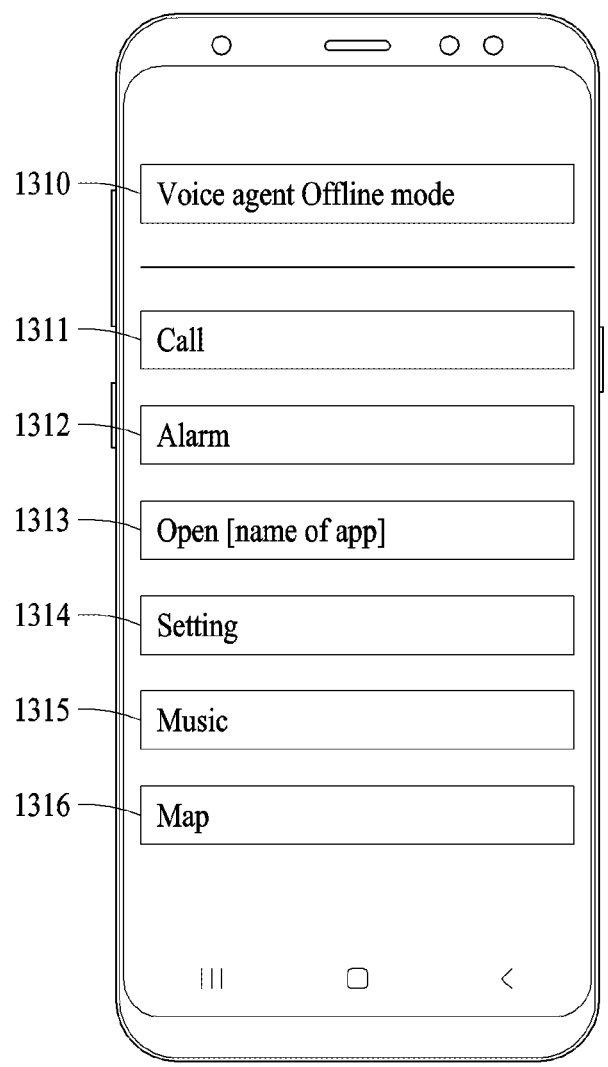
FIG. 13 is a diagram illustrating another example of a user interface according to various embodiments.

According to various example embodiments, as shown in the example of FIG. 13, the user interface may include a call 1311, an alarm 1312, an open 1313, a setting 1314, a music 1315, and a map 1316 in a voice agent offline mode menu 1310.

According to various example embodiments, the processor 530 may provide a user interface related to an application supportable on a device for processing a user utterance.

Figure 14:
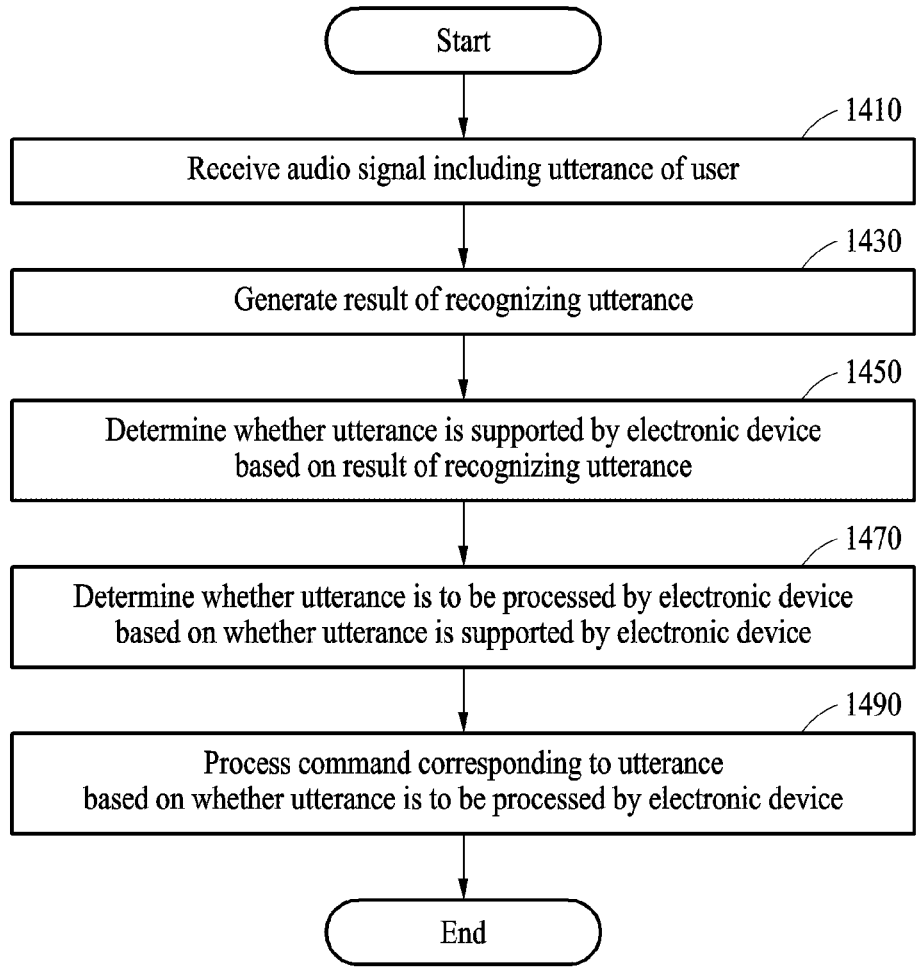
FIG. 14 is a flowchart illustrating an example operation of an electronic device according to various embodiments.

FIG. 14 is a flowchart illustrating an example operation of an electronic device according to various embodiments.

Referring to FIG. 14, according to various example embodiments, in operation 1410, a processor (e.g., the processor 530 of FIG. 5) may receive an audio signal including an utterance of a user using a microphone (e.g., the microphone 150-1 of FIG. 2). In operation 1430, the processor 530 may generate a result of recognizing the utterance. The processor 530 may generate the result of generating the utterance by generating a text corresponding to the utterance by performing automatic speech recognition (ASR) based on the utterance.

According to various example embodiments, in operation 1450, the processor 530 may determine whether the utterance is supported by an electronic device (e.g., the electronic device 500 of FIG. 5) based on the result of recognizing the utterance. In operation 1470, the processor 530 may determine whether the utterance is to be processed by the electronic device 500 based on whether the utterance is supported by the electronic device 500.

According to various example embodiments, the processor 530 may determine whether the utterance is processible by the electronic device 500 by inputting the result of recognizing the utterance into a rule-based NL model. The processor 530 may determine whether an application (or an app) for processing the utterance is supported by the electronic device 500 based on the rule-based NL model.

According to various example embodiments, the processor 530 may process a command corresponding to the utterance using a linked application for processing the utterance when the result of recognizing the utterance includes a predetermined pattern.

According to various example embodiments, the processor 530 may search for an application to perform a command corresponding to the utterance based on the result of recognizing the utterance. The processor 530 may determine whether the application is executable by the electronic device. The processor 530 may transmit the result of recognizing the utterance to a server (e.g., the server 108 of FIG. 1) based on whether the application is executable by the electronic device. The processor 530 may transmit the result of recognizing the utterance or the audio signal to the server 108 when the application is not executable by the electronic device.

According to various example embodiments, the processor 530 may determine a need for an additional parameter for processing a command corresponding to the utterance. The processor 530 may search a memory (e.g., the memory 550 of FIG. 5) based on a need for an additional parameter.

According to various example embodiments, the type of the additional parameter may include a first type including numerical value information, a second type including information related to an operation for processing the utterance, and a third type including category information of information for processing the utterance.

According to various example embodiments, in operation 1490, the processor 530 may process a command corresponding to the utterance based on whether the utterance is to be processed by the electronic device.

According to various example embodiments, an electronic device (e.g., the electronic device 101 of FIG. 1) may include: a microphone (e.g., the microphone 150-1 of FIG. 2) configured to receive an audio signal including an utterance, a processor (e.g., the processor 120 of FIG. 1), and a memory (e.g., the memory 130 of FIG. 1) configured to store instructions to be executed by the processor, wherein the processor may be configured to: generate a result of recognizing the utterance, determine whether the utterance is supported by the electronic device based on the result of recognizing the utterance, determine whether the utterance is to be processed by the electronic device based on whether the utterance is supported by the electronic device, and process a command corresponding to the utterance based on whether the utterance is to be processed by the electronic device.

According to various example embodiments, the processor may be configured to generate the result of recognizing the utterance by generating a text corresponding to the utterance by performing automatic speech recognition (ASR) based on the utterance.

According to various example embodiments, the processor may be configured to: determine whether the utterance is processible by the electronic device by inputting the result of recognizing the utterance into a rule-based natural language model, and determine whether an application for processing the utterance is supported by the electronic device based on the rule-based natural language model.

According to various example embodiments, the processor may be configured to process a command corresponding to the utterance using a linked application for processing the utterance based on the result of recognizing the utterance including a specified pattern.

According to various example embodiments, the processor may be configured to: search for an application to perform a command corresponding to the utterance based on the result of recognizing the utterance, determine whether the application is executable by the electronic device, and control the electronic device to transmit the result of recognizing the utterance to a server (e.g., the server 108 of FIG. 1) based on whether the application is executable by the electronic device.

According to various example embodiments, the processor may be configured to control the electronic device to transmit the result of recognizing the utterance or the audio signal to the server based on the application not being executable by the electronic device.

According to various example embodiments, the processor may be configured to: determine a need for an additional parameter for processing a command corresponding to the utterance, and search the memory based on the need.

According to various example embodiments, the processor may be configured to: obtain a type of an additional parameter for processing a command corresponding to the utterance, and determine whether the utterance is to be processed by the electronic device based on the type.

According to various example embodiments, the type of the additional parameter may include a first type including numerical value information, a second type including information related to an operation for processing the utterance, and a third type including category information of information for processing the utterance.

According to various example embodiments, an electronic device may include: a microphone configured to receive an audio signal including an utterance, a processor, and a memory configured to store instructions to be executed by the processor, wherein the processor may be configured to: generate a result of recognizing the utterance, determine whether the utterance is primarily supported by the electronic device by performing a first classification based on a rule based on the result of recognizing the utterance, determine whether the utterance is secondarily supported by the electronic device by performing a second classification based on whether the utterance is primarily supported by the electronic device, and process a command corresponding to the utterance based on whether the utterance is secondarily supported by the electronic device.

According to various example embodiments, the processor may be configured to generate the result of recognizing the utterance by generating a text corresponding to the utterance by performing automatic speech recognition (ASR) based on the utterance.

According to various example embodiments, the processor may be configured to: determine whether the utterance is processible by the electronic device by inputting the result of recognizing the utterance into a rule-based natural language model, and determine whether the utterance is primarily supported by the electronic device by determining whether an application for processing the utterance is supported by the electronic device based on the rule-based natural language model.

According to various example embodiments, the processor may be configured to process a command corresponding to the utterance using a linked application for processing the utterance based on the result of recognizing the utterance including a specified pattern.

According to various example embodiments, the processor may be configured to determine whether the utterance is secondarily supported by the electronic device by performing a classification of a target operation for processing the utterance.

According to various example embodiments, the processor may be configured to: search for an application to perform a command corresponding to the utterance based on the result of recognizing the utterance, determine whether the utterance is secondarily supported by the electronic device by determining whether the application is executable by the electronic device, and control the electronic device to transmit the result of recognizing the utterance to a server based on whether the utterance is secondarily supported by the electronic device.

According to various example embodiments, the processor may be configured to control the electronic device to transmit the result of recognizing the utterance or the audio signal to the server based on the application not being executable by the electronic device.

According to various example embodiments, the processor may be configured to: determine a need for an additional parameter for processing a command corresponding to the utterance, and search the memory based on the need.

According to various example embodiments, the processor may be configured to: obtain a type of an additional parameter for processing a command corresponding to the utterance, and determine whether the utterance is to be processed by the electronic device based on the type.

According to various example embodiments, the type of the additional parameter may include a first type including numerical value information, a second type including information related to an operation for processing the utterance, and a third type including category information of information for processing the utterance.

According to various example embodiments, an utterance processing method of an electronic device may include: receiving an audio signal including an utterance, generating a result of recognizing the utterance, determining whether the utterance is supported by the electronic device based on the result of recognizing the utterance, determining whether the utterance is to be processed by the electronic device based on whether the utterance is supported by the electronic device, and processing a command corresponding to the utterance based on whether the utterance is to be processed by the electronic device.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a microphone;
at least one processor including processing circuitry; and
a memory storing instructions that, when executed by the at least one processor individually and/or collectively, cause the electronic device to:
generate a result of recognizing an utterance,
determine a need for an additional parameter for processing a command corresponding to the utterance,
search the memory based on the need for the additional parameter,
determine a need for prompt to request the additional parameter based on a result of the search,
transmit the result of recognizing to a server based on the need for the prompt,
determine whether the utterance is processible by the electronic device by inputting the result of recognizing the utterance into a rule-based natural language model,
search for an application to perform a command corresponding to the utterance based on whether the utterance is processible by the electronic device,
determine whether the application is executable by the electronic device, and
process the command corresponding to the utterance based on whether the application is executable by the electronic device.

2. The electronic device of claim 1, wherein the instructions, when executed by the at least one processor individually or collectively, cause the electronic device to:
generate the result of recognizing the utterance by generating a text corresponding to the utterance by performing automatic speech recognition (ASR) based on the utterance.

3. The electronic device of claim 1, wherein the instructions, when executed by the at least one processor individually or collectively, cause the electronic device to:
determine whether an application for processing the utterance is supported by the electronic device based on output of the rule-based natural language model.

4. The electronic device of claim 1, wherein the instructions, when executed by the at least one processor individually or collectively, cause the electronic device to:
process the command corresponding to the utterance using a linked application for processing the utterance based on the result of recognizing the utterance including a specified pattern.

5. The electronic device of claim 1, wherein the instructions, when executed by the at least one processor individually or collectively, cause the electronic device to:
perform classification of a target operation for processing the utterance, based on the result of recognizing the utterance, and
search for an application to perform the command corresponding to the utterance based on a result of the classification.

6. The electronic device of claim 1, wherein the instructions, when executed by the at least one processor individually or collectively, cause the electronic device to:
transmit the result of recognizing the utterance or an audio signal received by the microphone which includes the utterance to a server based on the application not being executable by the electronic device.

7. The electronic device of claim 1, wherein the instructions, when executed by the at least one processor individually or collectively, cause the electronic device to:
obtain a type of an additional parameter for processing the command corresponding to the utterance, and
determine whether the utterance is to be processed by the electronic device based on the type.

8. The electronic device of claim 7, wherein the type of the additional parameter comprises: a first type including numerical value information, a second type including information related to an operation for processing the utterance, and a third type including category information of information for processing the utterance, and
wherein the instructions, when executed by the at least one processor individually or collectively, cause the electronic device to:
determine a need for an additional information to process the command corresponding to the utterance in response to the type of the additional parameter is the first type, determine whether a personal information stored in the memory is matched with the additional parameter in response to the type of the additional parameter is the second type, and determine whether a category of an information for processing the utterance is supportable by the electronic device in response to the type of the additional parameter is the third type.

9. An electronic device, comprising:
a microphone;
at least one processor including processing circuitry; and
a memory storing instructions that, when executed by the at least one processor individually and/or collectively, cause the electronic device to:
generate a result of recognizing an utterance,
determine a need for an additional parameter for processing a command corresponding to the utterance,
search the memory based on the need for the additional parameter,
determine a need for prompt to request the additional parameter based on result of the search,
transmit the result of recognizing to a server based on the need for the prompt,
determine whether the utterance is primarily supported by the electronic device by determining whether the utterance is processible by the electronic device, by inputting the result of recognizing the utterance into a rule-based natural language model,
search for an application to perform a command corresponding to the utterance based on whether the utterance is primarily supported by the electronic device,
determine whether the utterance is secondarily supported by the electronic device by determining whether the application is executable by the electronic device, and
process the command corresponding to the utterance based on whether the utterance is secondarily supported by the electronic device.

10. The electronic device of claim 9, wherein the instructions, when executed by the at least one processor individually or collectively, cause the electronic device to:
generate the result of recognizing the utterance by generating a text corresponding to the utterance by performing automatic speech recognition (ASR) based on the utterance.

11. The electronic device of claim 9, wherein the instructions, when executed by the at least one processor individually or collectively, cause the electronic device to:
determine whether the utterance is primarily supported by the electronic device by determining whether an application for processing the utterance is supported by the electronic device based on an output of the rule-based natural language model.

12. The electronic device of claim 9, wherein the instructions, when executed by the at least one processor individually or collectively, cause the electronic device to:
process the command corresponding to the utterance using a linked application for processing the utterance based on the result of recognizing the utterance including a specified pattern.

13. The electronic device of claim 9, wherein the instructions, when executed by the at least one processor individually or collectively, cause the electronic device to:
perform classification of a target operation for processing the utterance, based on the result of recognizing the utterance, search for an application to perform the command corresponding to the utterance based on result of the classification.

14. The electronic device of claim 9, wherein the instructions, when executed by the at least one processor individually or collectively, cause the electronic device to:
transmit the result of recognizing the utterance or an audio signal received by the microphone which includes the utterance to a server based on the application not being executable by the electronic device.

15. The electronic device of claim 9, wherein the instructions, when executed by the at least one processor individually or collectively, cause the electronic device to:
obtain a type of an additional parameter for processing the command corresponding to the utterance, and
determine whether the utterance is to be processed by the electronic device based on the type.

16. The electronic device of claim 15, wherein the type of the additional parameter comprises: a first type including numerical value information, a second type including information related to an operation for processing the utterance, and a third type including category information of information for processing the utterance, and
wherein the instructions, when executed by the at least one processor individually or collectively, cause the electronic device to:
determine a need for an additional information to process the command corresponding to the utterance in response to the type of the additional parameter is the first type,
determine whether a personal information stored in the memory is matched with the additional parameter in response to the type of the additional parameter is the second type, and
determine whether a category of an information for processing the utterance is supportable by the electronic device, in response to the type of the additional parameter is the third type.

17. An utterance processing method of an electronic device, the utterance processing method comprising:
receiving an audio signal including an utterance;
generating a result of recognizing the utterance;
determining a need for an additional parameter for processing a command corresponding to the utterance;
searching for a memory based on the need for the additional parameter;
determining a need for prompt to request the additional parameter based on a result of the search;
transmitting the result of recognizing to a server based on the need for the prompt;
determining whether the utterance is processible by the electronic device by inputting the result of recognizing the utterance into a rule-based natural language model;
searching for an application to perform a command corresponding to the utterance based on whether the utterance is processible by the electronic device;
determining whether the application is executable by the electronic device, and
processing the command corresponding to the utterance based on whether the application is executable by the electronic device.

18. The electronic device of claim 13, wherein the instructions, when executed by the at least one processor individually or collectively, cause the electronic device to:

transmit the utterance, the result of recognizing the utterance, and the target operation to a server in response to the utterance is not supported by the electronic device.

\* \* \* \* \*